United States Patent
Katayama et al.

(10) Patent No.: US 6,195,508 B1
(45) Date of Patent: Feb. 27, 2001

(54) PHOTO FILM PACK FOR SELF-DEVELOPING PHOTO FILM UNITS WITH LIGHT-SHIELDING COVER SHEET, AND INSTANT CAMERA

(75) Inventors: Masaya Katayama; Kazunori Mizuno; Nobuo Sigiyama, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/389,501

(22) Filed: Sep. 3, 1999

(30) Foreign Application Priority Data

Sep. 9, 1998 (JP) .................................................. 10-255687
Sep. 9, 1998 (JP) .................................................. 10-255817

(51) Int. Cl.[7] .................................................. G03B 17/50
(52) U.S. Cl. .................................. 396/32; 396/34; 396/36
(58) Field of Search .............................. 396/30, 34, 527, 396/36, 583; 206/455

(56) References Cited

U.S. PATENT DOCUMENTS 3,607,283 * 9/1971 Gold ...................................... 396/527
5,541,683 * 7/1996 Kihara et al. ............................ 396/34

FOREIGN PATENT DOCUMENTS 7-209814    8/1995   (JP) .................................. G03C/3/00
10-28810  * 10/1998 (JP) .

* cited by examiner

Primary Examiner—D. Rutledge
(74) Attorney, Agent, or Firm—Sughrue, Mion, Zinn, Macpeak & Seas, PLLC

(57) ABSTRACT

An instant photo film pack has a pack body, which has a small thickness and has first and second walls opposed to each other, and contains a stack of plural self-developing photo film units. An exposure opening is formed in the first wall, and provides each of the photo film units with an exposure. An exit slit is formed in the pack body, disposed in an advancing direction, for exiting each of the photo film units. A light-shielding cover sheet closes the exposure opening in a light-tight manner, to be exited through the exit slit by an external operation. Two dimple-formed deformed portions are disposed on the light-shielding cover sheet to project toward the photo film units, and prevents a first photo film unit among the photo film units from passing the exit slit while the light-shielding cover sheet is exited, the first photo film unit being directly behind the light-shielding cover sheet.

22 Claims, 22 Drawing Sheets

PHOTO FILM PACK FOR SELF-DEVELOPING PHOTO FILM UNITS WITH LIGHT-SHIELDING COVER SHEET, AND INSTANT CAMERA

BACKGROUND OF THE INVENTION

1. Field of the Invention

The present invention relates to an instant photo film pack for self-developing photo film units with a light-shielding cover sheet, and an instant camera. More particularly, the present invention relates to an instant photo film pack in which a light-shielding cover sheet can effectively operate for protection from ambient light without influence to advancing photo film units, and an instant camera.

2. Description Related to the Prior Art

JP-A 7-209814 discloses an instant photo film pack with which an instant camera is loaded. The instant photo film pack includes a light-tight pack body having a box shape and formed from hard plastic material, and accommodates a stack of plural self-developing photo film units of a monosheet type.

Each of the photo film units is constituted by an exposure portion, a developing solution pod and a trapping portion. The exposure portion includes a photosensitive layer having an exposure surface, a white diffusion/reflection layer, and an image receiving layer having a back surface. The developing solution pod is disposed in an advancing direction from the exposure portion, and contains developing solution. When the developing solution is spread between the photosensitive layer and the image receiving layer, then a latent image recorded in the photosensitive layer is transferred to the image receiving layer as a positive image through the diffusion/reflection layer. The image transferred to the image receiving layer becomes observable in the back surface reverse to the exposure surface. The trapping portion is disposed in a direction reverse to the advancing direction from the exposure portion, and traps and hardens a surplus part of the developing solution spread between the photosensitive layer and the image receiving layer.

There is an exposure opening formed in the instant photo film pack for introducing light from a photographic subject to the exposure portion of one of the photo film units when positioned in the instant camera. A light-shielding cover sheet is stacked on the first one of the photo film units and is placed to close the exposure opening for preventing entry of ambient light. When a claw member of the instant camera is driven for a first time, the claw member pushes a bottom of the light-shielding cover sheet, so that the light-shielding cover sheet is advanced and exited from an exit slit of the instant photo film pack. The exit slit is disposed in a wall directed crosswise to the front wall of the instant photo film pack having the exposure opening.

The light-shielding cover sheet, when exited from the instant photo film pack, is advanced to a position between spreader rollers incorporated in the instant camera. The spreader rollers rotate to cause the light-shielding cover sheet to exit from the instant camera through a camera exit slot formed on a top wall of the instant camera. Upon the exiting of the light-shielding cover sheet, a first one of the photo film units is set at the exposure opening.

At each time that one exposure is taken, one of the photo film units is pushed up toward the outside by the claw member. The photo film unit is nipped by the spreader rollers and advanced toward the camera exit slot. Then the spreader rollers spreads the developing solution to the whole of the exposure surface of the photo film unit for a developing operation. Then a succeeding one of the photo film units is pushed up and set directly behind the exposure opening.

It has been found that the developing solution can be adequately spread if each of the photo film units is deformed in its thickness direction to compress a space for flow of the developing solution in the thickness direction. Thus it is desired for the instant camera to have a structure for deforming each photo film unit in the thickness direction in the course of the advance. A spreading control member has been conceived, which is disposed between the exit slit of the instant photo film pack and the spreader rollers. Also, a passageway between the spreader rollers and the camera exit slot is constructed with an inclination.

The spreading control member is desired to be disposed so as to push the developing solution pod of the one photo film unit from the exit slit of the instant photo film pack in a direction from the back surface toward the exposure surface. Also, a passageway between the spreader rollers and the camera exit slot is desired to have an inclination for the purpose of keeping the exposure surface of the one photo film unit in greater contact with one of the spreader rollers closer to the exposure opening.

In the instant camera as described above, the light-shielding cover sheet is exited while deformed in the thickness direction. If the light-shielding cover sheet has a great thickness, the light-shielding cover sheet does not flex, or applies excessive load to a motor driving the spreader rollers in the instant camera. There arises a problem in a quick consumption of power of a battery in the instant camera as a power source. If the light-shielding cover sheet is provided with a reduced thickness on the other hand, load applied to the spreader rollers can be reduced, as the light-shielding cover sheet can be readily deformed in the thickness direction. But there occurs a considerable gap between the light-shielding cover sheet and the inside of the exit slit in the instant photo film pack during the passage of the exit slit. It is likely that a first one of the photo film units before being exposed may be exited together with the light-shielding cover sheet.

In the instant photo film pack, a cutout is formed, disposed between a bottom wall and the front wall having the exposure opening, and has an L-shape as viewed in section for entry of the claw member. It is known according to the prior art to use black light-shielding film for closing the cutout light-tightly. The black light-shielding film is attached to the bottom edge of the light-shielding cover sheet, and extended downwards from the light-shielding cover sheet. The extended portion closes the bottom part of the cutout. However, the light-shielding cover sheet is easily deformable in the thickness direction particularly if the light-shielding cover sheet has a small thickness. Upon the deformation of the light-shielding cover sheet, there occurs a gap between an inner surface of the instant photo film pack and an end of the light-shielding cover sheet as viewed in its width direction crosswise to the advancing direction. As the cutout is located laterally in the width direction of the instant photo film pack, the occurrence of the gap may cause entry of ambient light through an end of the cutout, to fog or expose the exposure surface of the photo film units accidentally.

SUMMARY OF THE INVENTION

In view of the foregoing problems, an object of the present invention is to provide an instant photo film pack with a light-shielding cover sheet with which the first one of the photo film units can be kept from moving together even if the light-shielding cover sheet has a small thickness.

Another object of the present invention is to provide an instant photo film pack with a light-shielding cover sheet with which a corner cutout in a body of the pack can be shielded from ambient light even if the light-shielding cover sheet has a small thickness.

In order to achieve the above and other objects and advantages of this invention, a light-shielding cover sheet for an instant photo film pack is provided, the instant photo film pack including a pack body, having a small thickness and having first and second walls opposed to each other, for containing a stack of plural self-developing photo film units, an exposure opening, formed in the first wall, for providing each of the photo film units with an exposure, and an exit slit, formed in the pack body, disposed in an advancing direction, for exiting each of the photo film units. In the light-shielding cover sheet, a cover sheet member closes the exposure opening in a light-tight manner, the cover sheet member being exited through the exit slit by an external operation. At least one projection portion is disposed on the cover sheet member to project toward the photo film units, for preventing a first photo film unit among the photo film units from passing the exit slit while the cover sheet member is exited, the first photo film unit being directly behind the cover sheet member.

In a preferred embodiment, the at least one projection portion is disposed close to an edge of the cover sheet member disposed in the advancing direction, for pushing an edge of the first photo film unit.

The light-shielding cover sheet comprises at least one deformed portion, formed with the cover sheet member, having a convex face and a dimple face reverse thereto, the convex face constituting the at least one projection portion. The at least one projection portion further includes at least one ridge, disposed on the convex face, and extended in the advancing direction.

The exit slit and the at least one projection portion have respectively a predetermined clearance and a predetermined thickness in a thickness direction of the cover sheet member, and the predetermined thickness is greater than the predetermined clearance.

The instant photo film pack further includes a claw-receiving cutout, disposed at one corner of the pack body, formed in a wall of the pack body opposite to the exit slit, for receiving insertion of a claw member to push the photo film units and the cover sheet member. Furthermore, a light-shielding film is secured to an edge of the cover sheet member disposed in a direction reverse to the advancing direction, extended to close the claw-receiving cutout, for preventing entry of ambient light. A skirt portion is disposed on the light-shielding film, located along an edge of the cover sheet member extending from the one corner in the advancing direction, for projecting away from the exposure opening, to ensure a light-shielded state at the edge.

The skirt portion is constituted by a bent extension of the light-shielding film.

According to one aspect of the present invention, the pack body is formed from polystyrene. The instant photo film pack has at least one pad insertion opening, formed in the second wall, for receiving insertion of at least one pad member, the pad member being adapted to push up the photo film units toward the exposure opening. A flexible bottom light-shielding sheet is formed from plastic material having compatibility with polystyrene, has a thickness of 0.3–0.45 mm, and is disposed behind the photo film units, extended on the second wall to close the pad insertion opening in a light-tight manner, and flexed away from the second wall by the pad member inserted in the pad insertion opening. A light-shielding push plate is resilient and flexible, formed from plastic material having compatibility with polystyrene, has a thickness of 0.5–1.0 mm, partially secured to the bottom light-shielding sheet, disposed between the bottom light-shielding sheet and the photo film units, the light-shielding push plate, when the bottom light-shielding sheet is flexed, is pushed by the bottom light-shielding sheet, for transmitting pushing force of the pack mechanism to the photo film units being stacked by fitting on a back surface of the stack of the photo film units.

According to another aspect of the present invention, the instant photo film pack further includes a light-shielding flap, having a substantially quadrilateral shape, for closing the exit slit in an openable manner, to prevent entry of ambient light, the light-shielding flap having first and second longer side lines and first and second shorter side lines. First, second and third predetermined adhering regions are disposed in the light-shielding flap, at least the first, second and third predetermined adhering regions being coated with adhesive agent thereon, and attached to the pack body, wherein the first adhering region extends along the first longer side line, the second and third adhering regions have a substantially dot shape, and are disposed at respectively the first and second shorter lines, and the exit slit is disposed between the second and third adhering regions.

The adhesive agent is hot-melt adhesive agent.

According to still another aspect of the present invention, the instant photo film pack further includes a light-shielding flap, having a substantially quadrilateral shape, for closing the exit slit in an openable manner, to prevent entry of ambient light, the light-shielding flap having first and second longer side lines and first and second shorter side lines. A predetermined adhering region is disposed in the light-shielding flap, at least the predetermined adhering region being coated with adhesive agent thereon, attached to the pack body, and including a linear portion and first and second lateral portions, wherein the linear portion extends along the first longer side line, the first and second lateral portions are disposed at respective ends of the linear portion and extend along respectively the first and second shorter side lines, and the exit slit is disposed between the first and second lateral portions.

According to another aspect of the present invention, the instant photo film pack further includes a light-shielding flap for closing the exit slit in an openable manner, to prevent entry of ambient light. Plural predetermined adhering regions are disposed in the light-shielding flap and arranged in a longitudinal direction thereof, at least the plural predetermined adhering regions being coated with adhesive agent thereon, and attached to the pack body.

According to an additional aspect of the present invention, the bottom light-shielding sheet includes at least one cutout and has a small-width portion adjacent to the cutout, and the small-width portion has a greater flexibility.

The light-shielding push plate has first and second edges extending crosswise to the advancing direction. The light-shielding push plate further includes at least one bent portion disposed along at least one of the first and second edges, for projecting toward the photo film units, to support at least one edge of the stack of the photo film units extending crosswise to the advancing direction behind the photo film units.

When the bottom light-shielding sheet closes the pad insertion opening, the light-shielding push plate is extended along the bottom light-shielding sheet, and the at least one bent portion contacts a rear of the stack of the photo film units.

According to another aspect of the present invention, an instant camera loadable with an instant photo film pack is provided. In the instant camera, a pack chamber receives insertion of the instant photo film pack. A door member closes the pack chamber in an openable manner. At least one ad member is disposed on an inner face of the door member, inserted into the pack body through the pad insertion opening upon closing of the door member, for flattening one of the photo film units directly behind the exposure opening by pushing the photo film units in contact with the at least one light-shielding member, the pad member being constructed to be distant from the first wall by at least a predetermined distance when in a free state while the door member is closed, the predetermined distance being equal to a sum of a thickness of the at least one light-shielding member and a thickness of each one of the photo film units, so as to prevent deformation of a final one of the photo film units at the exposure opening.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
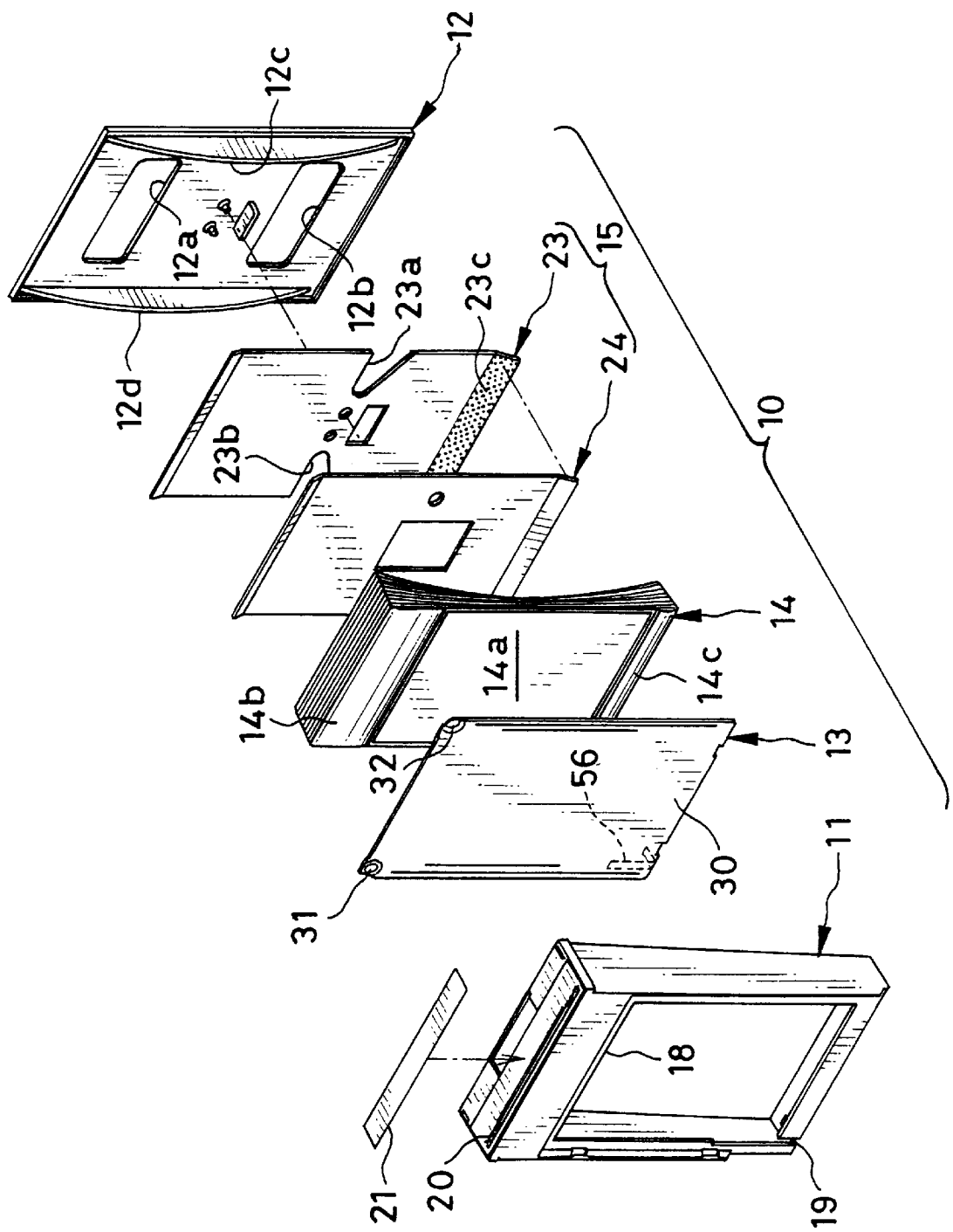
FIG. 1 is an exploded perspective illustrating an instant photo film pack.

In FIG. 1, an instant photo film pack 10 has a pack body constituted by a case member 11 with a first wall and a second wall 12. The pack body contains a stack of self-developing photo film units 14, a light-shielding cover sheet 13 and two light-shielding members 15.

The case member 11 is formed from plastic material. An exposure opening 18 is formed in the first wall of the case member 11 for providing each of the photo film units 14 with an exposure by introducing light from a photographic subject. A claw-receiving cutout 19 is formed at one bottom corner of the exposure opening 18 for receiving insertion of an ejecting claw member well-known in the art. An exit slit 20 is formed in the top wall of the case member 11 for exiting an exposed one of the photo film units 14. Each of the photo film units 14 and the light-shielding cover sheet 13 are exited through the exit slit 20. A soft light-shielding flap 21 is attached to close the exit slit 20. To allow passage of the light-shielding cover sheet 13 or the photo film units 14, one edge of the light-shielding flap 21 along one longer side line is attached to the exit slit 20. The light-shielding cover sheet 13 is laid on a first one of the photo film units 14, and closes the exposure opening 18 in a light-tight manner.

Each of the photo film units 14 includes an exposure region 14a, a developing solution pod 14b along one edge, and a trapping portion 14c along another edge. The exposure region 14a is constituted by a photosensitive layer having an exposure surface, a diffusion/reflection layer of a white color, and an image receiving layer with a back surface. The developing solution pod 14b is disposed in an advancing direction from the exposure region 14a, and encloses developing solution. When the developing solution is spread between the photosensitive layer and the image receiving layer, a latent image, which is recorded to the photosensitive layer, is transferred through the diffusion/reflection layer to the image receiving layer as a positive image. The image transferred to the image receiving layer becomes observable on the back surface opposite to the exposure region 14a. The trapping portion 14c is positioned in reverse to the advancing direction from the exposure region 14a, and traps and hardens a surplus part of the developing solution having been spread between the photosensitive layer and the image receiving layer. A thickness of the exposure region 14a is smaller than that of the developing solution pod 14b and the trapping portion 14c. The photo film units 14 are a monosheet type which can be treated as a single sheet constantly, and have a shape of a rectangular quadrilateral being vertically longer than horizontally. In the present embodiment, the photo film units 14 are advanced in the vertical direction.

The second wall 12 is also formed from plastic material. Two pad insertion openings 12a and 12b are formed in the i second wall 12, on which two support ridges 12c and 12d are disposed. The second wall 12 is secured to the case member 11 and opposed to the exposure opening 18. The pad insertion openings 12a and 12b are arranged in the second wall 12 at a predetermined interval, and cause pad members of an instant camera to enter the instant photo film pack 10 when the camera is loaded with the instant photo film pack 10.

The support ridges 12c and 12d are disposed on the second wall 12 to extend vertically, and project toward the exposure opening 18 in an arc shape. The support ridges 12c and 12d contact a back surface of the final one of the photo film units 14, to keep the photo film units 14 in the arc-shape which is convex toward the exposure opening 18. If the photo film pack is handled carelessly, the light-shielding cover sheet 13 may be depressed inside the exposure opening 18 toward the second wall 12. However the support ridges 12c and 12d can operate for minimizing a gap occurring between the exposure opening 18 and the light-shielding cover sheet 13, to prevent the photo film units 14 from being fogged with ambient light incident to the exposure opening 18.

A flexible bottom light-shielding sheet 23 and a resilient light-shielding push plate 24 are combined to constitute the light-shielding members 15. The bottom light-shielding sheet 23 has a middle portion secured to the second wall 12, and closes the pad insertion openings 12a and 12b in the second wall 12 before loading into the instant camera. Two cutouts 23a and 23b are formed in the bottom light-shielding sheet 23 in positions respectively along opposite edges of the bottom light-shielding sheet 23. After the loading into the camera, the pad members push and flex the bottom light-shielding sheet 23 toward the exposure opening 18 between the support ridges 12c and 12d, so as to push the photo film units 14 toward the exposure opening 18. For the bottom light-shielding sheet 23 and the light-shielding push plate 24 to press the developing solution pod 14b and the trapping portion 14c to a greater extent than the exposure region 14a, the bottom light-shielding sheet 23 and the light-shielding push plate 24 have horizontal edges bent toward the exposure opening 18.

A bottom edge of the light-shielding push plate 24 is attached to a bottom edge 23c of the bottom light-shielding sheet 23 in the attaching region indicated by the dotted portion. The light-shielding push plate 24 operates to avoid looseness of the bottom light-shielding sheet 23, and also to shield light entering through the pad insertion openings 12a and 12b. When the bottom light-shielding sheet 23 is resiliently flexed by pressure of the pad members of the instant camera, the light-shielding push plate 24 pushes the photo film units 14 and flattens a first one of the photo film units 14 directly behind the exposure opening 18.

A preferred example of the plastic material for forming the light-shielding cover sheet 13 is polystyrene with carbon black added thereto, for the purpose of obtaining high softness even with a small thickness. If the density of the carbon black is too high, the strength of the light-shielding cover sheet 13 is insufficient. If the density of the carbon black is too low, the light-shielding ability of the light-shielding cover sheet 13 is insufficient. If the thickness of the light-shielding cover sheet 13 is too great, its softness is insufficient. If the thickness of the light-shielding cover sheet 13 is too small, molding the light-shielding cover sheet 13 is very likely to result in failure. Consequently the light-shielding cover sheet 13 according to the present invention has a thickness of 0.3–0.45 mm, and includes carbon black of 0.5–1.1 wt. %.

Figure 2:
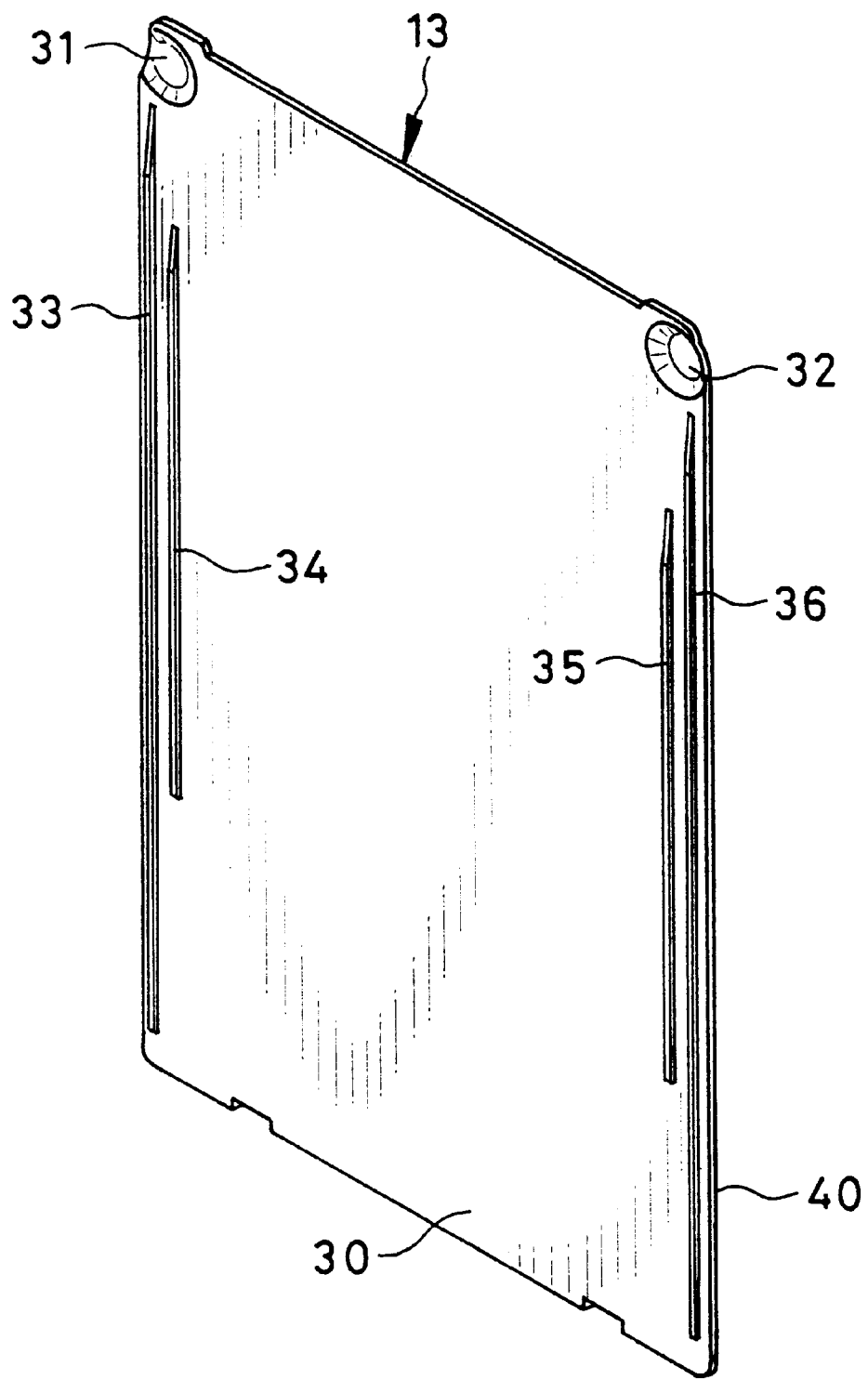
FIG. 2 is a front perspective illustrating a light-shielding cover sheet.

In FIG. 2, a front surface 30 of the light-shielding cover sheet 13 is illustrated. The front surface 30 is provided with a pair of dimple-formed deformed portions 31 and 32 or projection portions, and two pairs of light-shielding ridges 33, 34, 35 and 36. The dimple-formed deformed portions 31 and 32 are located close to the top edge of the light-shielding cover sheet 13. The light-shielding ridges 33–36 respectively extend in the advancing direction, and have a small width. Among those, the light-shielding ridges 33 and 34 are located close to one of two lateral sides of the light-shielding cover sheet 13. The light-shielding ridges 35 and 36 are located close to the opposite one of the two lateral sides of the light-shielding cover sheet 13.

Figure 3:
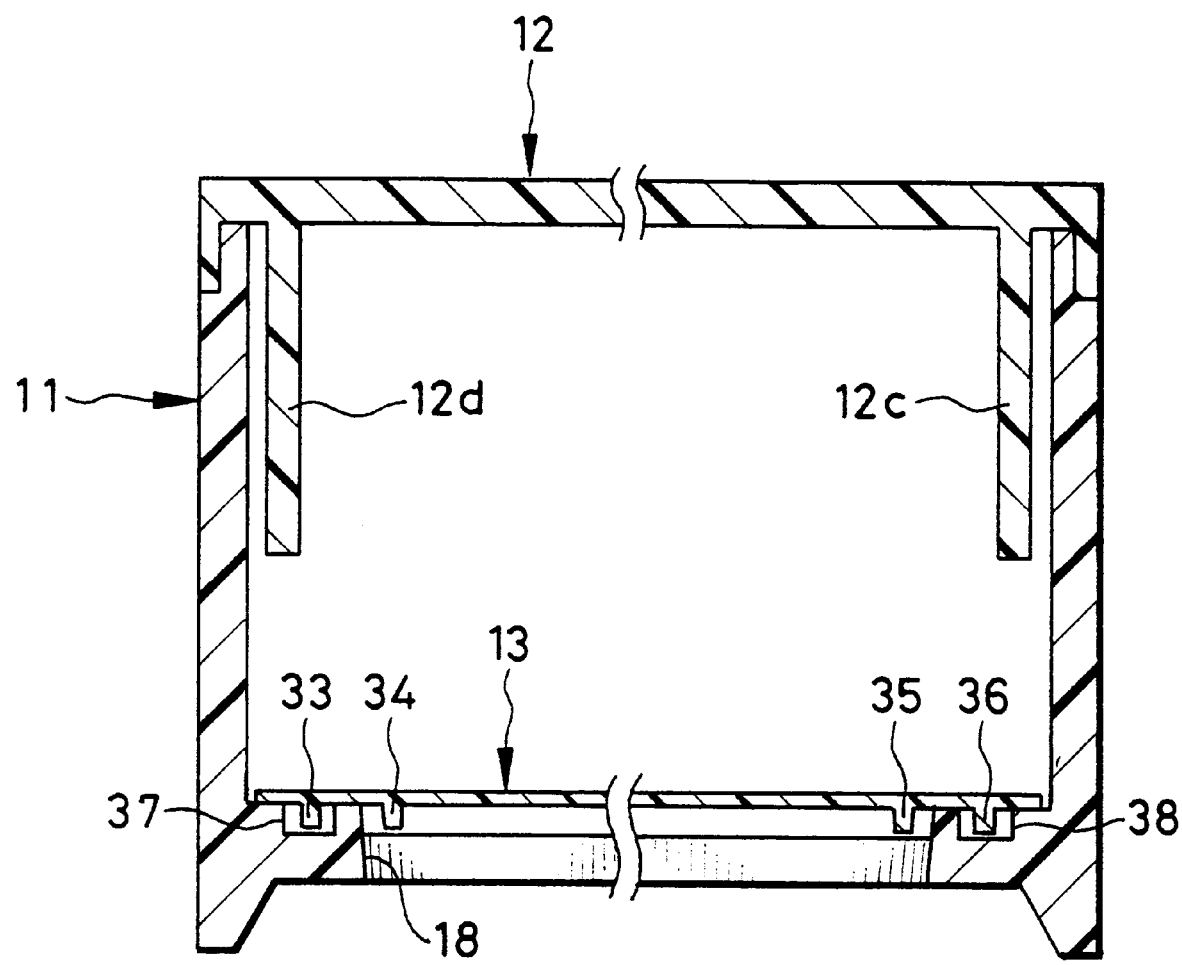
FIG. 3 is a cross section, partially cutaway, illustrating a pack body and the light-shielding cover sheet.

In FIG. 3, a groove 37 is formed in an inner surface along an edge of the exposure opening 18, and receives insertion of the light-shielding ridge 33. The light-shielding ridge 34 is positioned close to the edge of the exposure opening 18, and in combination with the groove 37, constitutes a labyrinth structure. Similarly a groove 38 receives insertion of the light-shielding ridge 36. The light-shielding ridge 35 constitutes labyrinth structure in combination with the groove 38. This prevents entry of ambient light through gaps along edges of the exposure opening 18 if the light-shielding cover sheet 13 is deformed in its thickness direction.

Figure 4:
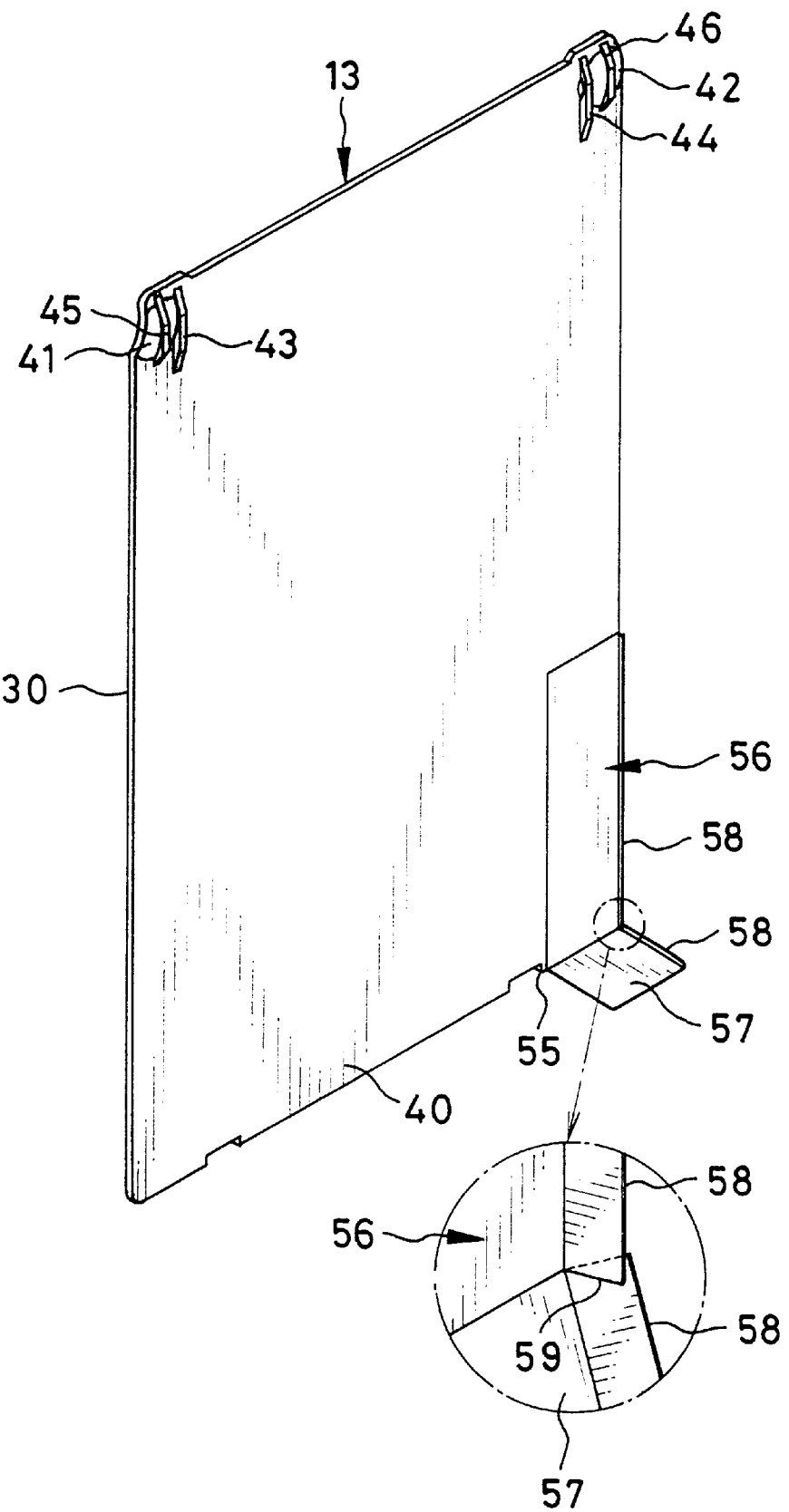
FIG. 4 is a rear perspective illustrating the light-shielding cover sheet.
Figure 5:
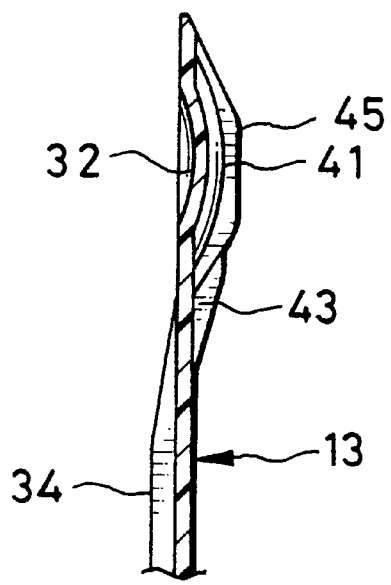
FIG. 5 is a cross section, partially cutaway, illustrating a dimple-formed deformed portion.
Figure 6:
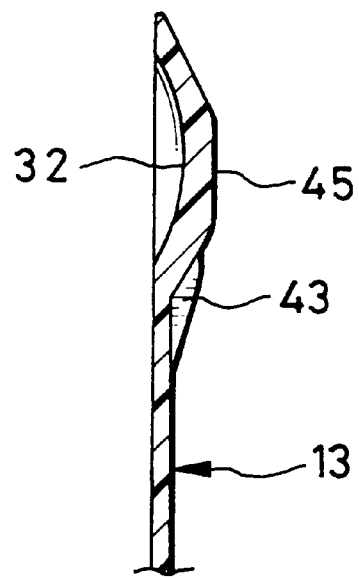
FIG. 6 is a cross section, partially cutaway, illustrating the same as FIG. 5 but taken on its center line.

In FIG. 4, a back surface 40 of the light-shielding cover sheet 13 is illustrated, and is provided with convex faces 41 and 42 or projection portions included in respectively the dimple-formed deformed portions 31 and 32. There are formed main ridges 43 and 44 and subsidiary ridges 45 and 46, all of which are projection portions, in positions of the convex faces 41 and 42. In FIG. 5, the dimple-formed deformed portions 31 and 32 have a thickness substantially equal to or smaller than that of the light-shielding cover sheet 13. The subsidiary ridges 45 and 46 are disposed to pass the respective centers of the convex faces 41 and 42, and extend in the advancing direction. Top ends of the subsidiary ridges 45 and 46 are close to the top edge of the light-shielding cover sheet 13. Bottom ends of the subsidiary ridges 45 and 46 are located lower than the convex faces 41 and 42. The main ridges 43 and 44 are disposed offset from the centers of the convex faces 41 and 42 toward the center of the light-shielding cover sheet 13. Top ends of the main ridges 43 and 44 are located lower than those of the subsidiary ridges 45 and 46. Also, bottom ends of the main ridges 43 and 44 are located lower than those of the subsidiary ridges 45 and 46. All of the ridges 43–46 have an equal projecting height. The subsidiary ridges 45 and 46 have a greater height with reference to the level of the back surface 40 than the main ridges 43 and 44, because the height of the subsidiary ridges 45 and 46 includes the maximum height of the convex faces 41 and 42.

Figure 7:
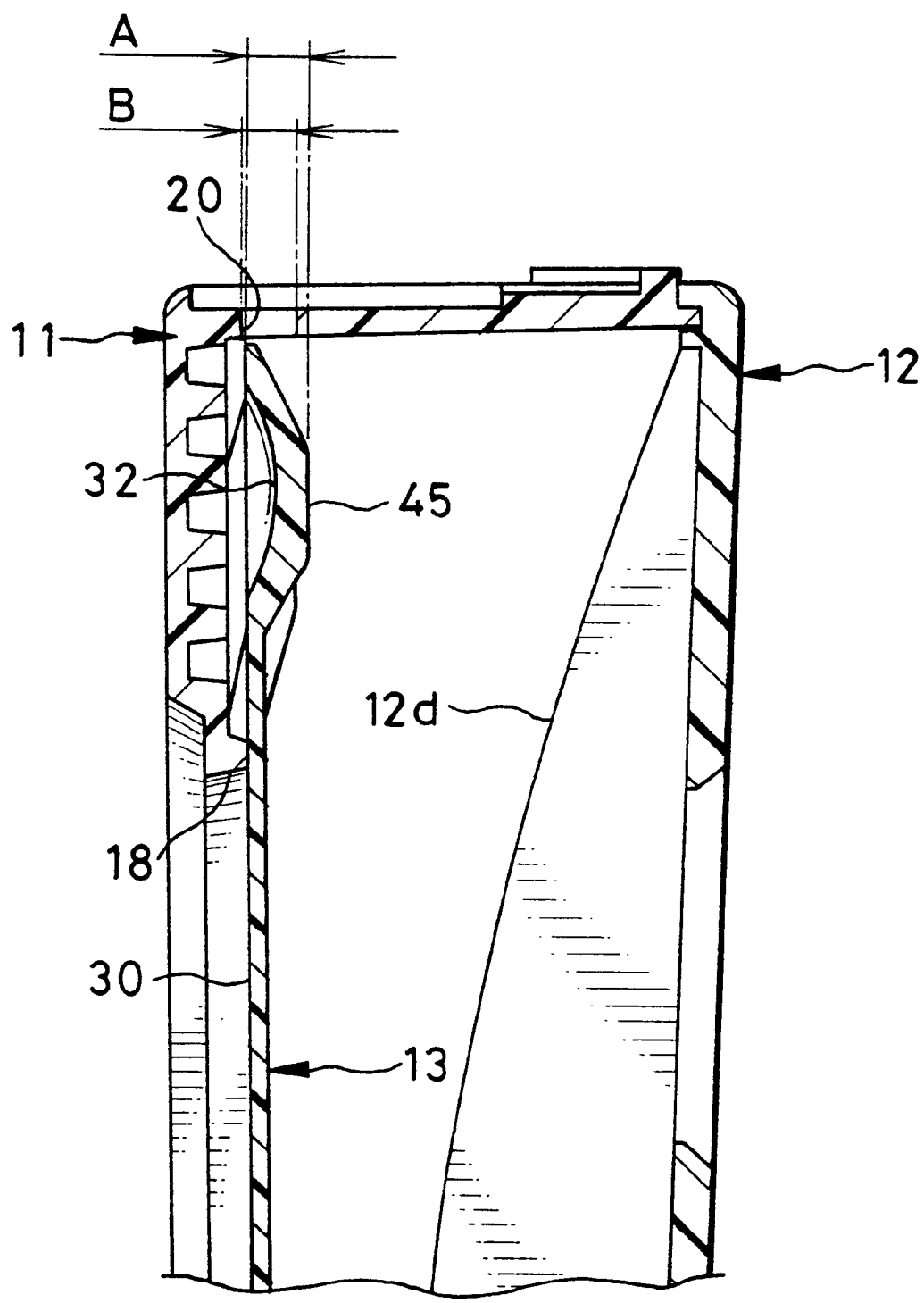
FIG. 7 is a cross section, partially cutaway, illustrating top parts of the pack body and the light-shielding cover sheet.
Figure 8:
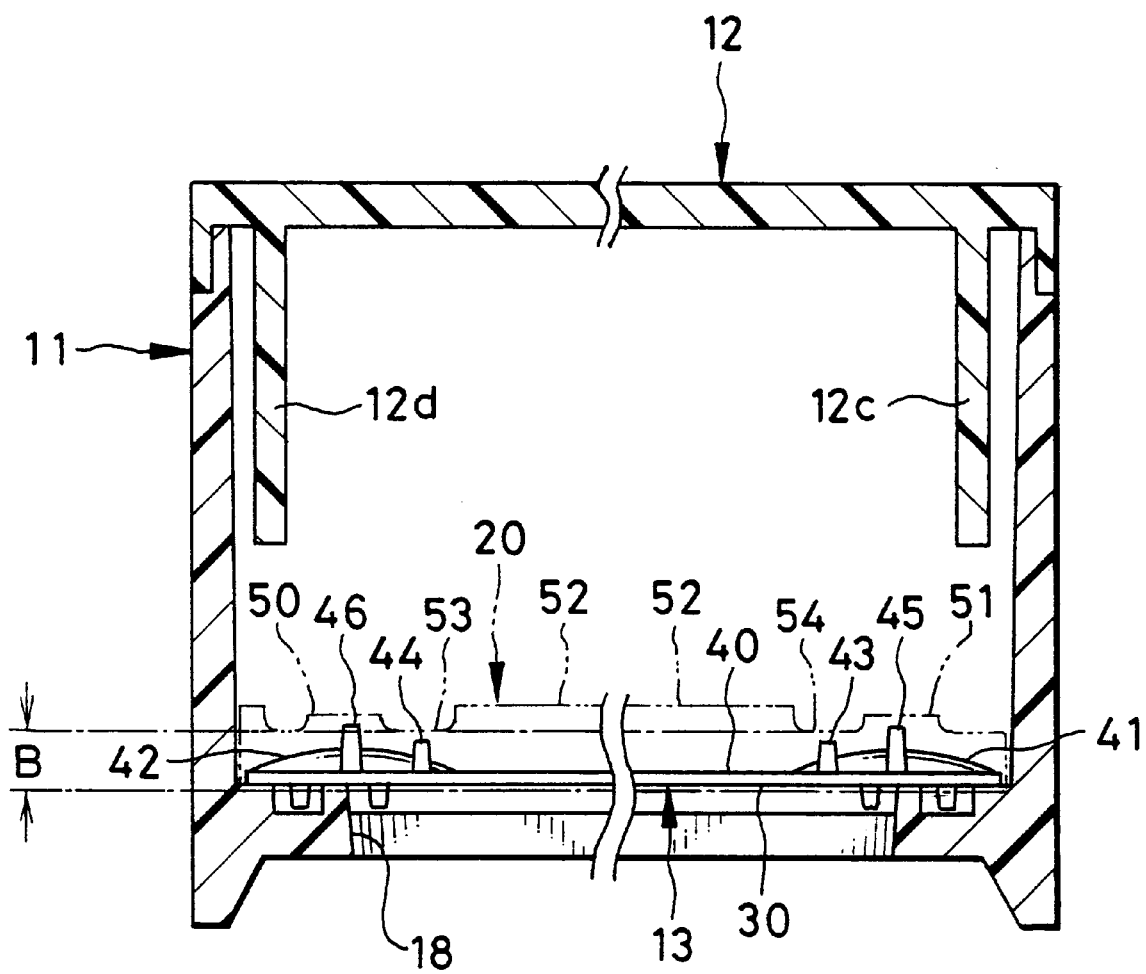
FIG. 8 is a cross section, partially cutaway, illustrating the same as FIG. 3 and also with an exit slit.

In FIGS. 7 and 8, the size A defined from the front surface 30 of the light-shielding cover sheet 13 to the subsidiary ridges 45 and 46 is greater than the standard clearance B of the exit slit 20. Thus the dimple-formed deformed portions 31 and 32 and the subsidiary ridges 45 and 46 constitute a separator mechanism for preventing the first one of the photo film units 14 from advancing together with the light-shielding cover sheet 13. The dimple-formed deformed portions 31 and 32 are very effective, because load applied to a drive mechanism for spreader rollers may be reduced in comparison with another separator mechanism which would include the subsidiary ridges 45 and 46 but not the dimple-formed deformed portions 31 and 32.

The exit slit 20, as viewed in the thickness direction of the photo film units 14, has a clearance or gap slightly greater than the thickness of the developing solution pod 14b. This clearance is a standard clearance of the exit slit 20. In the present embodiment, lateral regions 50 and 51 for passage of the subsidiary ridges 45 and 46 are provided with clearance slightly greater than the standard clearance B in the direction toward the second wall 12 for smoothing the advance of the light-shielding cover sheet 13. Also, a clearance of a middle region 52 of the exit slit 20 is determined slightly greater than the standard clearance B in the direction toward the second wall 12. So the light-shielding cover sheet 13 or the photo film unit 14 can be advanced smoothly if flexed by pressure of the support ridges 12c and 12d in a convex manner toward the second wall 12.

Intermediate regions 53 and 54 are defined between the middle region 52 and each of the lateral regions 50 and 51 for passage of the subsidiary ridges 45 and 46, and are provided with the standard clearance B according to the present embodiment. The intermediate regions 53 and 54 correspond to ranges of passage of the main ridges 43 and 44 of the light-shielding cover sheet 13. A height or distance from the front surface 30 of the light-shielding cover sheet 13 to a top of the main ridges 43 and 44 is slightly shorter than the standard clearance B. As viewed through the exit slit 20, the subsidiary ridges 45 and 46 have a height different from that of the main ridges 43 and 44. In correspondence to this, portions of the exit slit 20 have levels different from one another. Thus the structure with the main ridges 43 and 44 is effective in ensuring the separating operation of the dimple-formed deformed portions 31 and 32 and the subsidiary ridges 45 and 46.

Figure 9:
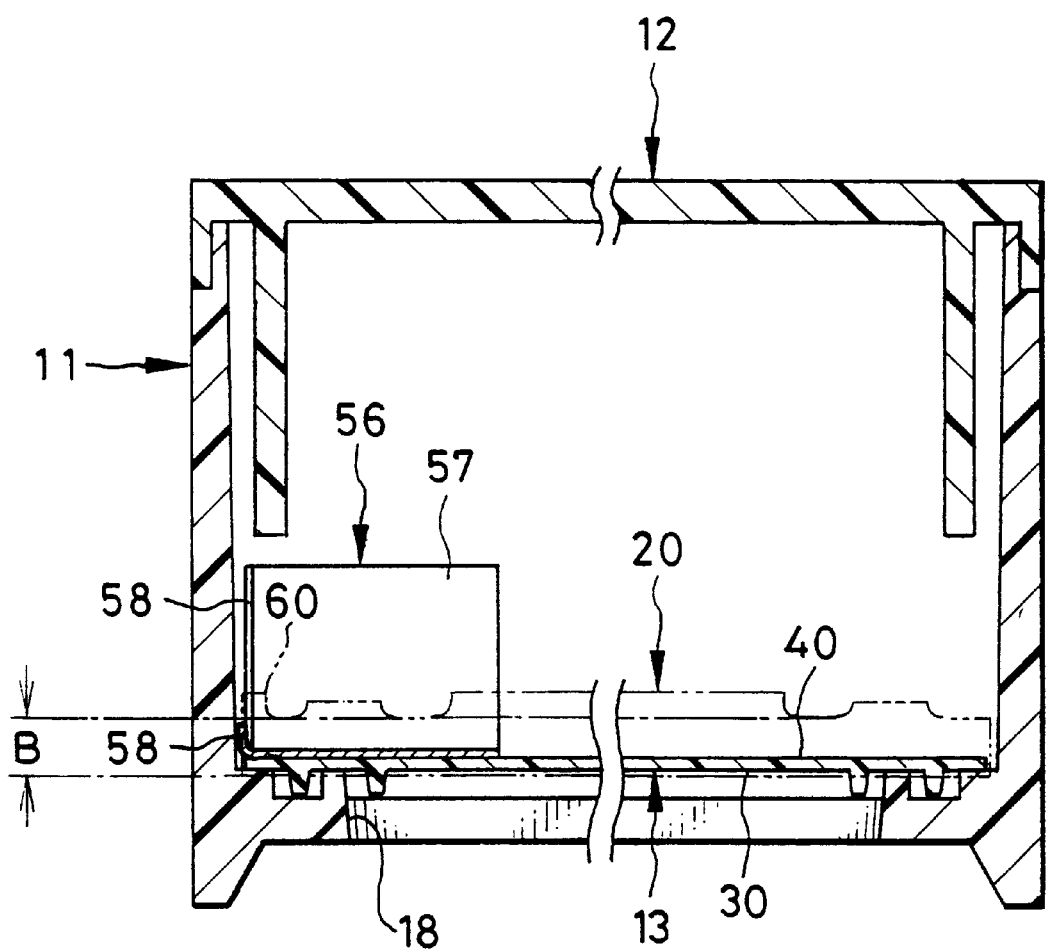
FIG. 9 is a cross section, partially cutaway, illustrating the same as FIG. 8 and also with a light-shielding film.

A short piece of light-shielding film 56 is attached to the back surface 40 of the light-shielding cover sheet 13 on a bottom edge 55 engageable with the ejecting claw member of an instant camera. See FIG. 4. The light-shielding film 56 is attached to the light-shielding cover sheet 13, and is provided with a rear extension portion 57, which extends from the light-shielding film 56 at the bottom edge of the light-shielding cover sheet 13, and is bent toward the second wall 12 in an L-shape to avoid entry of ambient light into a bottom part of the claw-receiving cutout 19. There is a skirt portion 58 formed with the light-shielding film 56, projecting from a lateral edge of the light-shielding cover sheet 13 with a small width, and being bent in an L-shape. The skirt portion 58 is disposed for the purpose of avoiding entry of ambient light into the claw-receiving cutout 19 particularly when a gap occurs along lateral edges of the light-shielding cover sheet 13 upon resilient deformation of the light-shielding cover sheet 13 in its thickness direction. Also the skirt portion 58 extends also to the edge of the rear extension portion 57. There is a cut 59 formed at the bend line of the rear extension portion 57 for facilitating bending of the skirt portion 58. In FIG. 9, the exit slit 20 includes a region 60 for passage of the skirt portion 58. The region 60 has a greater clearance than the standard clearance B.

Figure 10:
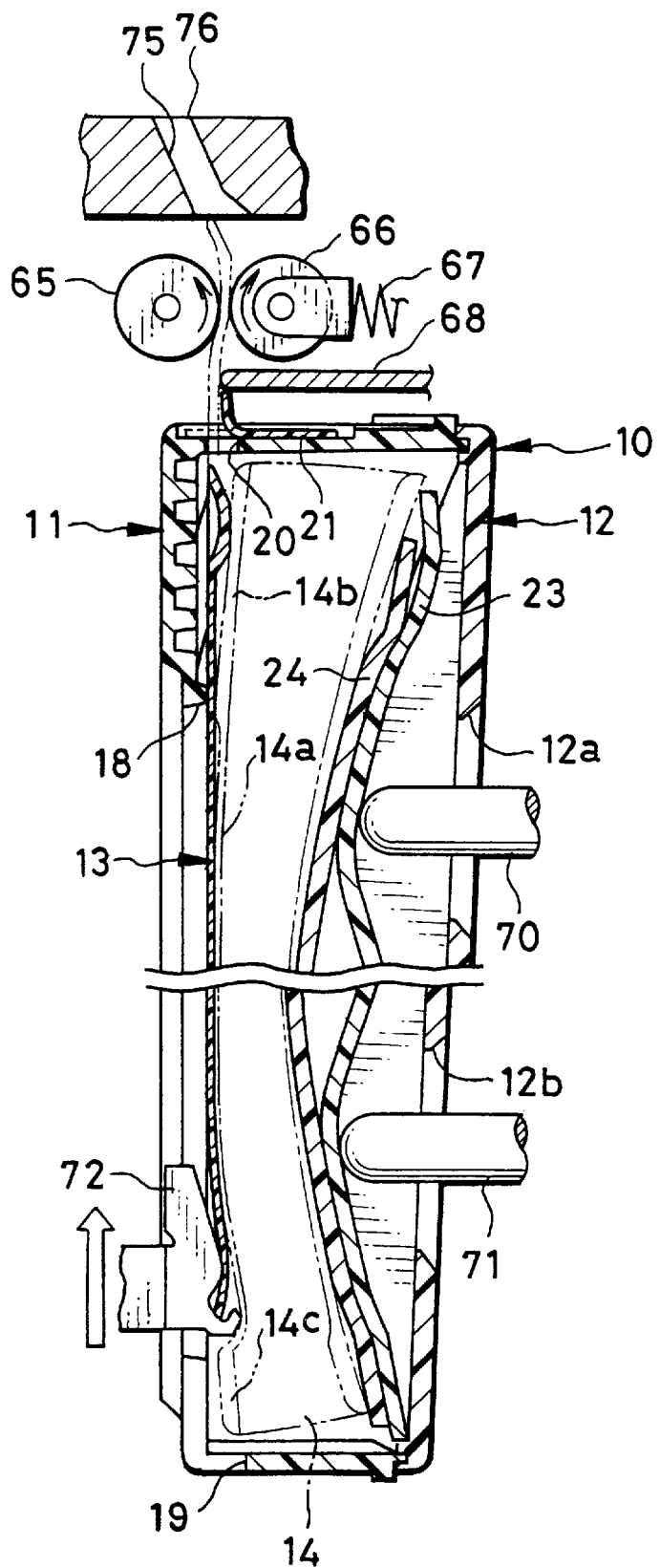
FIG. 10 is a vertical section, partially cutaway, illustrating a state of loading of the instant photo film pack in an instant camera.

In FIG. 10, a pair of spreader rollers 65 and 66 are disposed in the camera and above a pack chamber. The spreader roller 65 is so disposed that the exit slit 20 of the instant photo film pack 10 lies on a tangential line of the spreader roller 65. Rotation of a motor is transmitted to a shaft of the spreader roller 65, which is caused to rotate in a predetermined position. The spreader rollers 65 and 66 are arranged at one interval kept by a spacer (not shown). The spreader roller 66 is disposed in a shiftable manner in the thickness direction of the photo film units 14, and biased by a spring 67 toward the spacer. The spacer interval of the spreader rollers 65 and 66 is smaller than the thickness of the developing solution pod 14b, and also smaller than the size A defined from the front surface 30 of the light-shielding cover sheet 13 to the top of the subsidiary ridges 45 and 46.

For development of each of the photo film units 14, the spreader rollers 65 and 66 spread the developing solution from the developing solution pod 14b while the photo film unit 14 passes between them. It is further possible to regularize distribution of the developing solution on the entirety of the frame by controlling the flow and spreading of the developing solution. Thus a spreading control plate 68 is disposed between the exit slit 20 and the spreader rollers 65 and 66 to project in a manner crosswise to the tangent of the spreader roller 65 extending to each of the photo film units 14. The spreading control plate 68 frictionally pushes the photo film unit 14 in the thickness direction in the course of the advance, and controls the flow of the developing solution.

Figure 11:
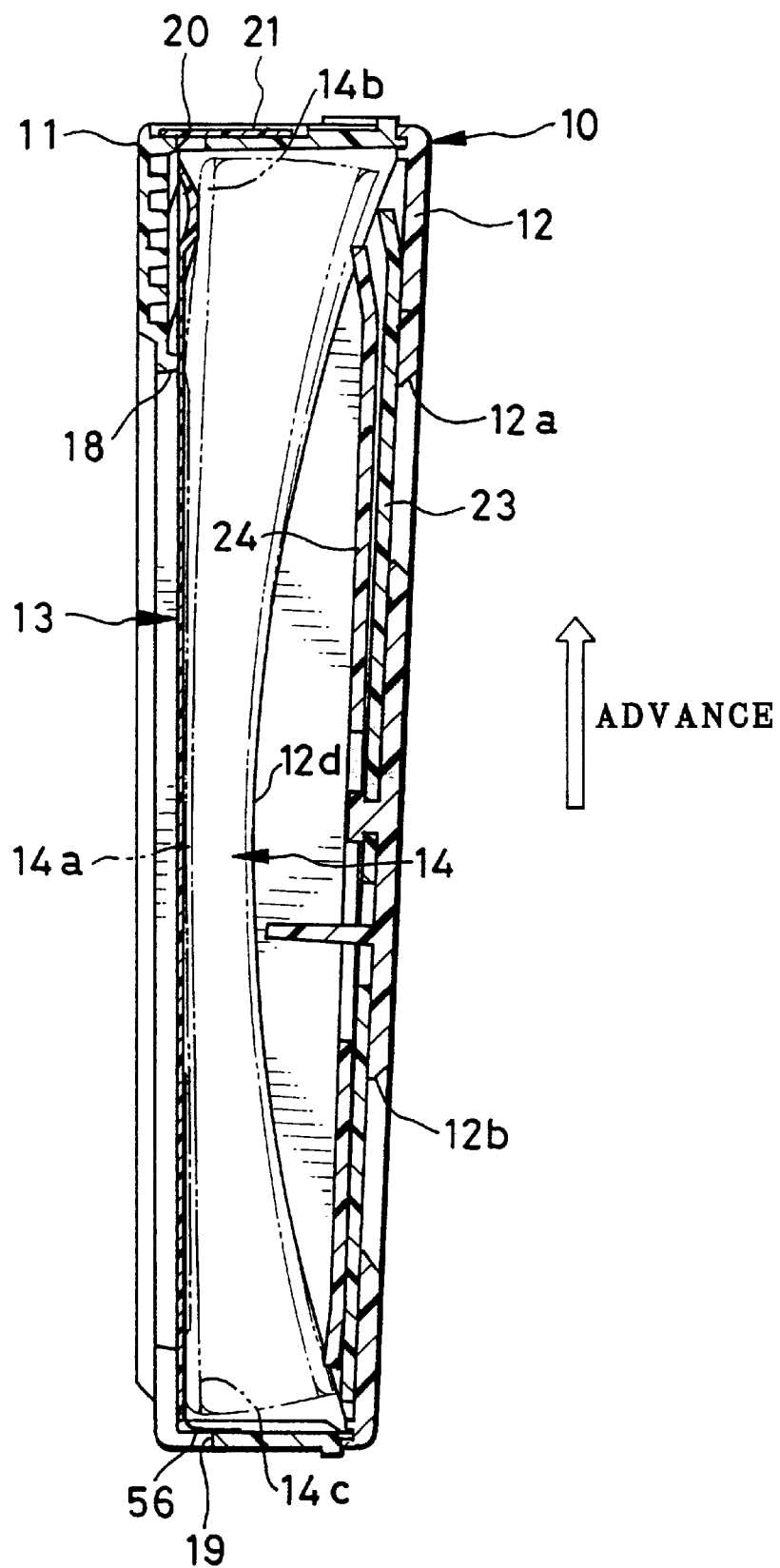
FIG. 11 is a vertical section illustrating the instant photo film pack before being used.

The operation of the above embodiment is described now. When the instant photo film pack 10 is unused, the exposure opening 18 is closed by the light-shielding cover sheet 13. The exit slit 20 is closed by the light-shielding flap 21. The pad insertion openings 12a and 12b are closed by the bottom light-shielding sheet 23. The claw-receiving cutout 19 is closed by the light-shielding film 56. Thus entry of ambient light into the instant photo film pack 10 is avoided. See FIG. 11. The back surface of the rearmost or final one of the photo film units 14 is contacted by the support ridges 12c and 12d. In the photo film units 14, the exposure region 14a has a smaller thickness than the developing solution pod 14b and the trapping portion 14c. The rearmost one of the photo film units 14 is kept curved by the contact with the support ridges 12c and 12d convexly in a direction toward the exposure opening 18.

Figure 12:
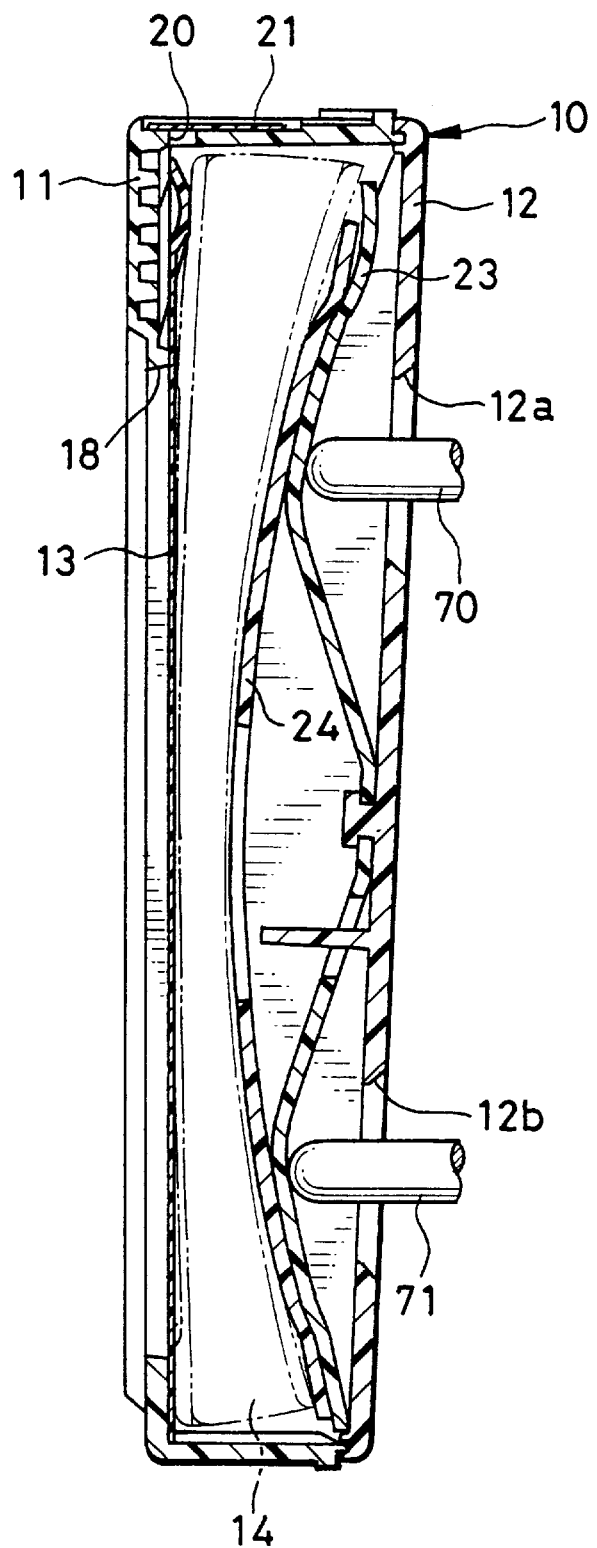
FIG. 12 is a vertical section illustrating the same as FIG. 11 but into which pad mechanisms are inserted.

When the loading chamber of the instant camera is loaded with the instant photo film pack 10, pad members 70 and 71 of the instant camera are inserted into the pad insertion openings 12a and 12b, to push the bottom light-shielding sheet 23 up toward the exposure opening 18. See FIG. 12. Thus the bottom light-shielding sheet 23 and the light-shielding push plate 24 are pressed against the back surface of the rearmost one of the photo film units 14, which is kept flexed in a convex shape at its middle toward the exposure opening 18.

After the pack chamber of the instant camera is loaded with the instant photo film pack 10, the shutter device is released for the purpose of standing by for exposures. In FIG. 10, a claw member 72 is inserted in the claw-receiving cutout 19, becomes engaged with a bottom edge of the light-shielding cover sheet 13, moves in the direction indicated by the arrow, and pushes and advances the light-shielding cover sheet 13 to the exit slit 20. The dimple-formed deformed portions 31 and 32 and the subsidiary ridges 45 and 46 keep the developing solution pod 14b of the first one of the photo film units 14 offset from the exit slit 20. The f first photo f film unit 14 can be reliably prevented from exiting by a contact with an edge of the exit slit 20 if it starts moving together with the light-shielding cover sheet 13.

When the light-shielding cover sheet 13 is exited from the exit slit 20 as much as a predetermined length by pushing the light-shielding flap 21 open, the claw member 72 moves to pass a position of the trapping portion 14c of the first photo film unit 14. The trapping portion 14c is caused by the pad members 70 and 71 to push an inner f ace adjacent to the exposure opening 18. Thus the first photo film unit 14 does not move together with the light-shielding cover sheet 13 also after passage of the dimple-formed deformed portions 31 and 32 and the subsidiary ridges 45 and 46 through the exit slit 20.

The light-shielding cover sheet 13 comes in contact with an edge of the spreading control plate 68, and advanced toward the spreader roller 65 in a loosely curved shape while frictionally pushed by the spreading control plate 68. When the top edge of the light-shielding cover sheet 13 comes in contact with the spreader roller 65, the light-shielding cover sheet 13 is flexed toward the spreader roller 66 by rotation of the spreader roller 65, and then positioned between the spreader rollers 65 and 66.

When the light-shielding cover sheet 13 is moved to the spreader rollers 65 and 66, the dimple-formed deformed portions 31 and 32 are collapsed by the spreader rollers 65 and 66 at a thickness according to the interval between the spreader rollers 65 and 66. To a passageway 75 with an inclination, the light-shielding cover sheet 13 is advanced while deformed in an S-shape by the spreading control plate 68. The light-shielding cover sheet 13 in the passageway 75 is so deformed as to contact the spreader roller 65 in a relatively large area, and advanced through a camera exit slit 76 to the outside of the instant camera. The skirt portion 58 of the light-shielding film 56 is bent in the L-shape in the width direction of the light-shielding cover sheet 13, but is passed through the region 60 in the exit slit 20 with a large space, and can be exited smoothly without interference. Then the first one of the photo film units 14 is set directly behind the exposure opening 18 and becomes ready to be exposed.

The light-shielding cover sheet 13 is deformed in the thickness direction by the spreading control plate 68 and the passageway 75 in the S-shape. In the light-shielding cover sheet 13, there occurs a force in recovering its original shape to be resistant against the advance. However the light-shielding cover sheet 13 has a smaller thickness than that according to the prior art, so the recovering force is smaller. Also the resistance is smaller. Furthermore, the dimple-formed deformed portions 31 and 32 are collapsed. If the torque of the motor for driving the spreader rollers 65 and 66 is not very high, the light-shielding cover sheet 13 can be reliably advanced. The use of a battery accommodated for driving the motor can be slower, as the use of the power source is less quick.

To take an exposure, the shutter device is released. After this, the spreader rollers 65 and 66 start rotating at the same time as the pushing operation of the claw member 72. The claw member 72 causes the top edge of the exposed first photo film unit 14 to exit from the exit slit 20 by the predetermined length. Then the top edge contacts the spreading control plate 68, which frictionally pushes the back surface of the first photo film unit 14 in the course of advance to the spreader roller 65. When the top edge of the first photo film unit 14 contacts the spreader roller 65, the spreader roller 65, which is rotating, slightly flexes the first photo film unit 14 convexly toward the spreader roller 66 before the first photo film unit 14 comes to the position between the spreader rollers 65 and 66. The first photo film unit 14 is deformed with a curve by the spreading control plate 68. Also the first photo film unit 14 is caused by the passageway 75 to contact the spreader roller 65 in a relatively large area, the spreader roller 65 being located on the side of the exposure surface. Therefore the spreading of the developing solution can be sufficient and regularized.

When the photo film unit 14 passes between the spreader rollers 65 and 66, the spreader roller 66 pressurizes the developing solution pod 14b to spread the developing solution therefrom. As the photo film unit 14 is continuously flexed in the thickness direction, a passageway for the developing solution is compressed to control the flow of the developing solution. A surplus part of the developing solution is captured and hardened by the trapping portion 14c. While the photo film unit 14 is squeezed by the spreader rollers 65 and 66, tension is applied to the photo film unit 14, which therefore can be advanced with stability. The spreading control plate 68 contacts the back surface reverse to the exposure surface of the photo film unit 14, and does not degrade the image quality of the photo film unit 14.

EXAMPLES

Experiments were conducted for checking internal light-tightness of the instant photo film pack 10 with changes in the attaching states of the light-shielding film 56 and the existence of the skirt portion 58.

| Samples | 1 | 2 | 3 | 4 |
| --- | --- | --- | --- | --- |
| Surface 30 or 40 of light-shielding cover sheet 13 for attachment of light-shielding film 56 | Front 30 | Front 30 | Back 40 | Back 40 |
| Existence of skirt portion 58 | No | Yes | No | Yes |
| Evaluation | B | B | B | A |

Note that, for the evaluation, occurrence of fogging of the photo film units 14 contained in the instant photo film pack 10 was checked. A represents a good condition without fogging, and B represents a failing condition with fogging. In Samples 1 and 2, the light-shielding film 56 was attached to the front surface 30 of the light-shielding cover sheet 13, so a part of the light-shielding film 56 was overlapped on the light-shielding ridge 33. There occurred a gap to cause entry of light through the claw-receiving cutout 19. In Sample 3, there were some of the photo film units 14 of which a portion at the claw-receiving cutout 19 was fogged as much as 1 mm from the margin. It is therefore concluded that the surface of the light-shielding cover sheet 13 for attaching the light-shielding film 56 may be each of the front surface 30 and the back surface 40 if the light-shielding film 56 does not overlap with a ridge or the like, and that fogging occurs if the skirt portion 58 does not exist.

Another preferred embodiment is described now, in which parts of an instant photo film pack can be recycled easily, and also in which photo film units can be kept flat and can be advanced reliably.

Japanese Patent Application No. 9-218136 suggests that, in an instant photo film unit, a predetermined plastic material is used for forming a light-shielding member disposed behind photo film units, and has compatibility with polystyrene from which the pack body is formed. This is for the purpose of improving recyclability of the pack body of the photo film pack. An example of the predetermined plastic material is polyphenylene ether.

However there is no known technique in which each of the two light-shielding members, including the flexible light-shielding sheet and the resilient light-shielding plate located behind the pack body, is formed from such plastic material compatible with the polystyrene from which the pack body is formed.

Figure 13:
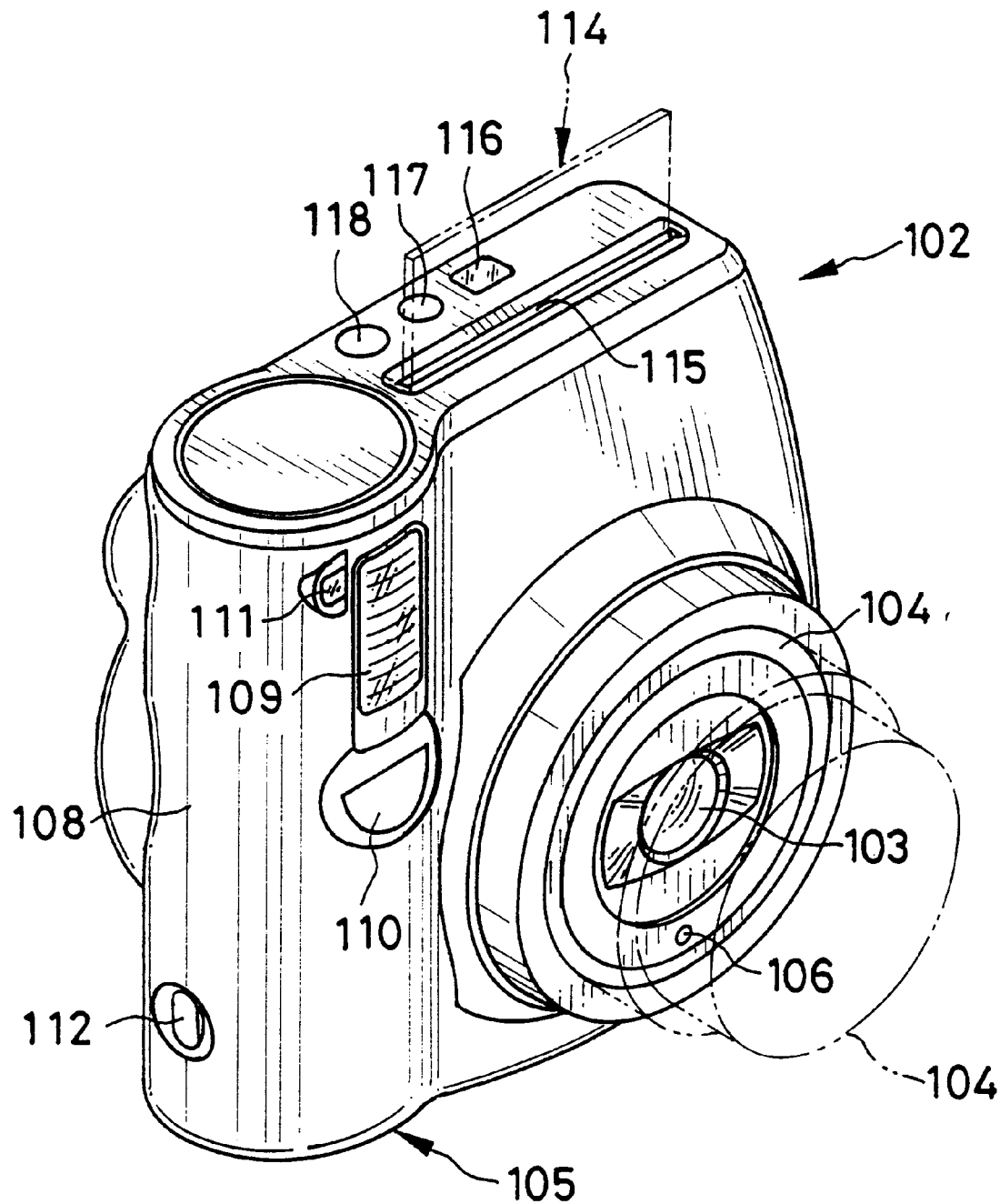
FIG. 13 is a perspective illustrating an instant camera loadable with another preferred instant photo film pack.

To solve such a problem, a preferred instant photo film pack is described now. In FIG. 13, an instant camera 102 has a quadrilateral shape as viewed from the front, and loaded with a photo film pack containing a plurality of self-developing photo film units. A lens barrel 104 is disposed in the front of the instant camera 102, and incorporates a taking lens 103. The lens barrel 104 is movable between a collapsed position where it is contained in a camera body 105, and two protruded positions where it is protruded in a forward direction from the camera body 105 as indicated by the phantom line in the drawing. So the instant camera 102 can be handled portably when not used. There is a photometric window 106 disposed under the lens barrel 104 and has a photometric element disposed in an inner position from the photometric window 106.

A grip 108 is disposed on one side of the instant camera 102, and has a cylindrical shape. There are a flash emitter window 109, a first shutter release button 110 and a viewfinder 111 disposed on the front of the grip 108. A second shutter release button 112 is disposed in lower position of the grip 108, and used to be depressed easily when a user grasps the instant camera 102 in an orientation of directing the grip 108 upwards. Also the top of the instant camera 102 has a camera exit slit 115, a counter window 116, a main switch 117, and a zone focusing button 118. The camera exit slit 115 exits each exposed one of self-developing photo film units 114. The counter window 116 indicates a remaining number of available unexposed film units. The main switch 117 is a power switch to be turned on and off for a power source of the instant camera 102. The zone focusing button 118 is used to set a subject distance to a photographic subject. When the main switch 117 is operated, the lens barrel 104 responsively moves forwards and backwards.

Figure 15:
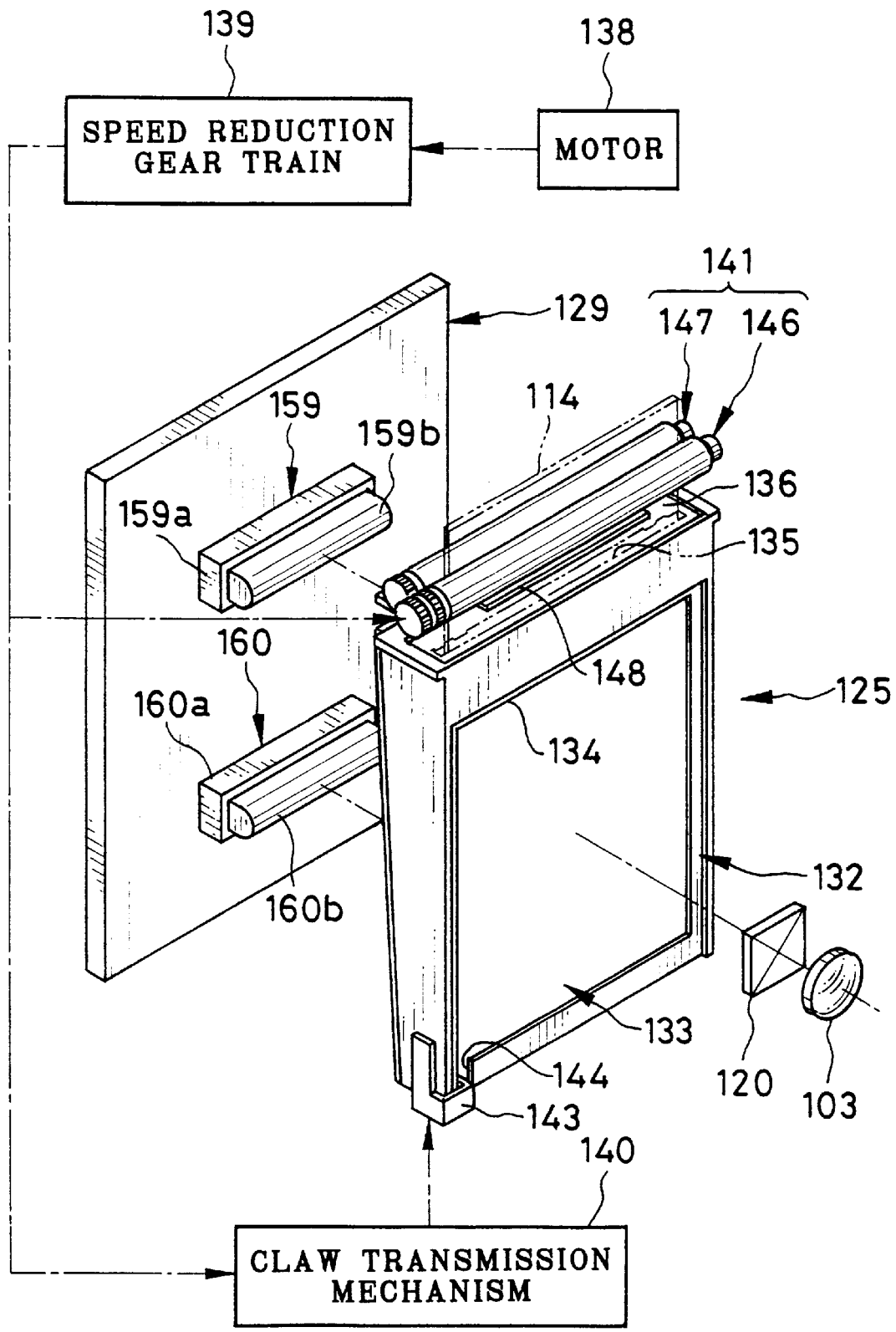
FIG. 15 is an explanatory view in a perspective and a block diagram, illustrating the same as FIG. 14.

With the instant camera 102, a user estimates a distance to a photographic subject by himself or herself, operates the zone focusing button 118, checks a region to be photographed, and depresses the first shutter release button 110. Then the subject light is measured photometrically through the photometric window 106. A shutter device 120, illustrated in FIG. 15 and incorporated in the lens barrel 104, is released according to the photometric value. If the photographic subject has a low brightness, then the flash emitter window 109 is automatically driven to emit flash to the photographic subject. After taking an exposure, the exposed one of the photo film units 114 is exited through the camera exit slit 115.

Figure 14:
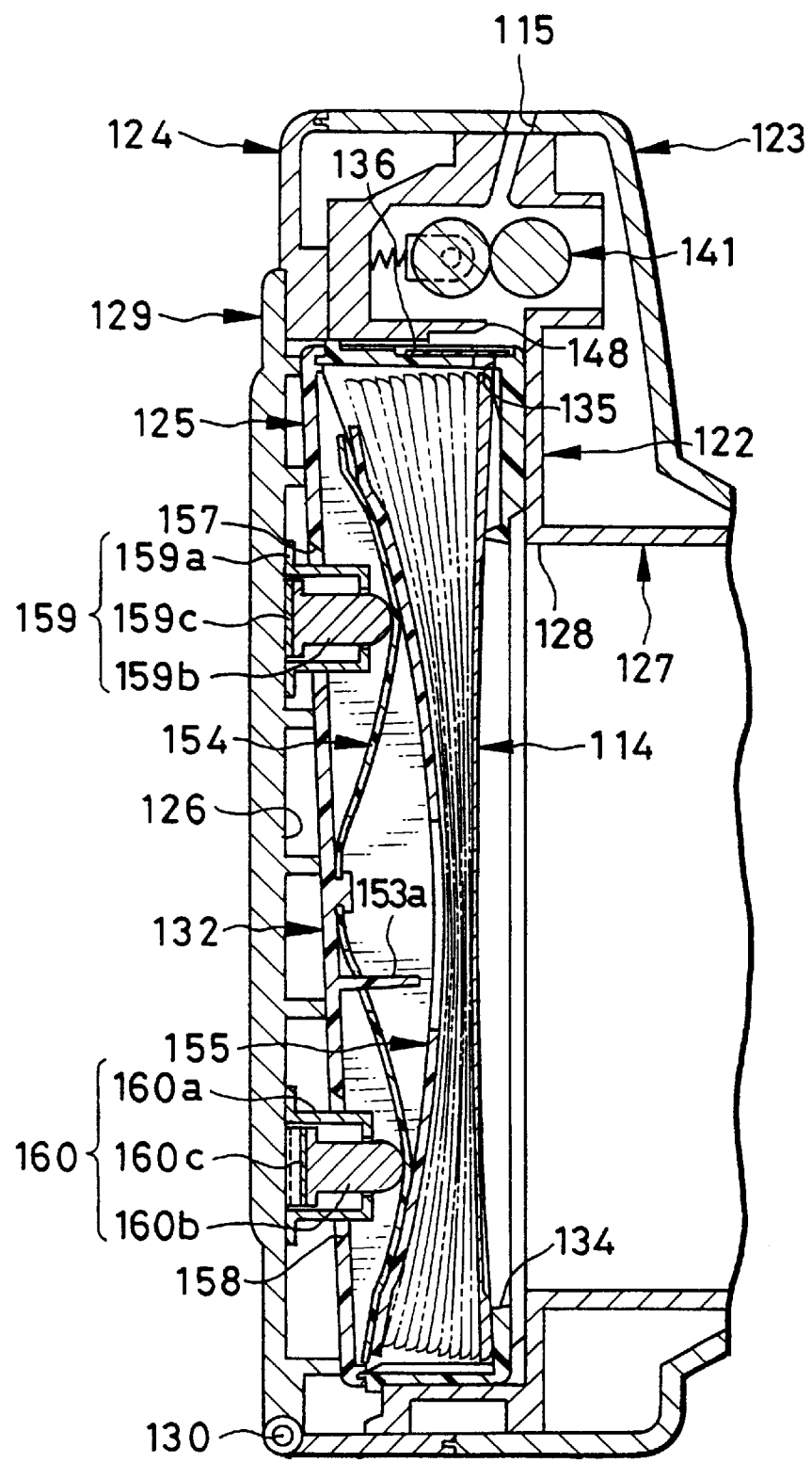
FIG. 14 is a vertical section, partially cutaway, illustrating the instant camera and the instant photo film pack inserted therein.

In FIG. 14, the instant camera 102 is constituted by a main body 122, a front cover 123 and a rear cover 124. The main body 122 incorporates various relevant parts for taking exposures, and is provided with a pack chamber 126 disposed in the rear and loadable with an instant photo film pack 125. A front of the main body 122 is provided with a light-shielding tunnel 127, which defines a photographic light path from the taking lens 103 to the instant photo film pack 125 in a state shielded from ambient light. When the lens barrel 104 is collapsed, the light-shielding tunnel 127 accommodates the lens barrel 104. There is an exposure aperture 128 formed between the pack chamber 126 and the light-shielding tunnel 127. A back door 129 for the pack chamber 126 is pivotally supported on the rear cover 124 by a hinge 130 in an openable manner.

When the instant photo film pack 125 is inserted in the pack chamber 126 of the instant camera 102, the shutter device 120 and the taking lens 103 become disposed in front of the instant photo film pack 125. See FIGS. 14 and 15. At each time of releasing the shutter device 120, one of the photo film units 114 set directly behind an exposure opening 134 is exposed. Also in response to the releasing operation of the shutter device 120, a photo film unit advancing mechanism is operated for advancing each one of the photo film units 114 to the outside of the camera. The advancing mechanism is constituted by a speed reduction gear train 139, a claw transmission mechanism 140 and spreader rollers 141. The speed reduction gear train 139 transmits rotation of a motor 138 and also reduces speed of the rotation. The claw transmission mechanism 140 and the spreader rollers 141 are actuated by the rotation transmitted by the speed reduction gear train 139.

The claw transmission mechanism 140 converts rotation of the motor 138 transmitted by the speed reduction gear train 139 to back-and-forth straight movement, which causes a claw member 143 to move vertically. A claw-receiving cutout 144 is formed in a corner of a pack body 132 and communicates to the exposure opening 134. The claw member 143 enters the claw-receiving cutout 144 in an upward direction, and becomes engaged with a bottom edge of a light-shielding cover sheet 133 or the photo film units 114 to push it to the outside of the pack body 132.

The spreader rollers 141 are constituted by a driving roller 146 and a driven roller 147. The driving roller 146 is caused by the speed reduction gear train 139 to rotate in a counterclockwise direction. The driven roller 147 is caused by the driving roller 146 to rotate in a clockwise direction. The driven roller 147 is pressed by a biasing member to the driving roller 146. There is a spreading control plate 148, disposed between an exit slit 135 of the instant photo film pack 125 and the spreader rollers 141, for helping the developing solution be spread in each one of the photo film units 114.

Figure 16:
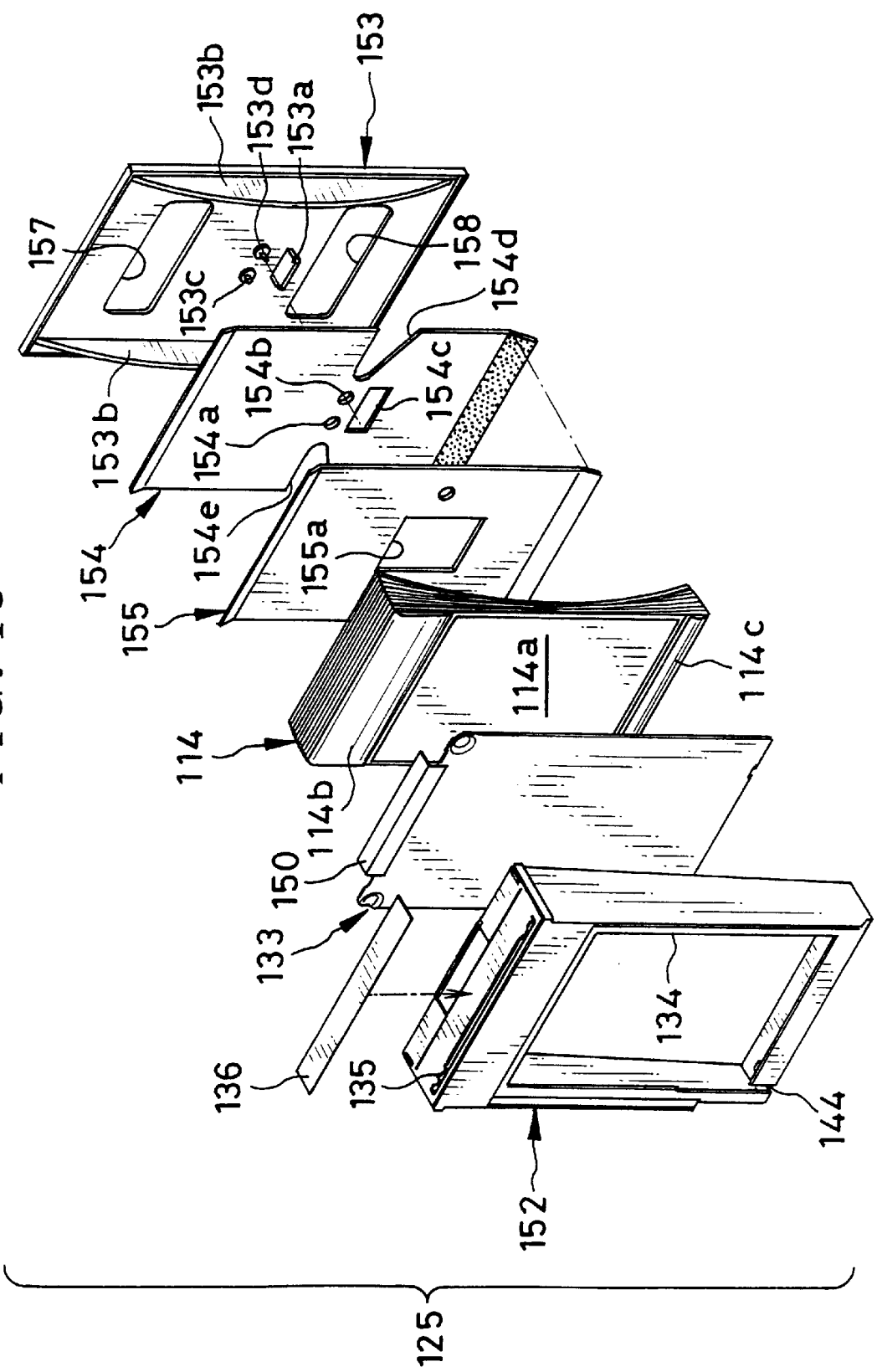
FIG. 16 is an exploded perspective illustrating the instant photo film pack of FIGS. 14 and 15.

In FIG. 16, the instant photo film pack 125 is structurally illustrated. Each of the photo film units 114 includes an exposure region 114a or exposure surface, a developing solution pod 114b along one edge, and a trapping portion 114c along another edge. The exposure region 114a is exposed by subject light or recording light inside an instant camera or a printer. The solution pod 114b encloses developing solution. The trapping portion 114c traps a surplus part of the developing solution.

The light-shielding cover sheet 133 is a thin plastic sheet having opacity and dark color. The light-shielding cover sheet 133 is thinner than the photo film units 114, and causes the advancing mechanism to receive a small resistance in the course of the photo film advance. The exit slit 135 is formed in the pack body 132. A top light-shielding flap 150 is secured to the light-shielding cover sheet 133, is constituted by a thin plastic film having opacity and dark color, and is opposed to the exit slit 135. In the pack body 132, the top light-shielding flap 150 is bent toward the photo film units 114, and closes a middle portion of the exit slit 135, and prevents the light-shielding cover sheet 133 and the photo film units 114 from slipping out of the exit slit 135 even when the instant photo film pack 125 is abruptly shocked or dropped strongly on a floor. Note that the light-shielding film 56, not shown in FIG. 16, is secured to a bottom corner of the light-shielding cover sheet 133 for closing the claw-receiving cutout 144 inside the pack body 132.

The pack body 132 is constituted by a case member 152 with a first wall, a second wall 153, a flexible bottom light-shielding sheet 154, and a resilient light-shielding push plate 155. The second wall 153 closes the rear opening of the case member 152. The bottom light-shielding sheet 154 and the light-shielding push plate 155 are secured to the inner face of the second wall 153. The case member 152 and the second wall 153 are plastic pieces formed from polystyrene.

There are two pad insertion openings 157 and 158 formed in the second wall 153. The instant camera 102 has pad mechanisms 159 and 160, which are disposed on the back door 129, and inserted in the pad insertion openings 157 and 158. The pad mechanism 159 is constituted by a pad holder 159a, a pad member 159b and a spring plate 159c. The pad holder 159a has a tubular shape and secured to the inner face of the back door 129. The pad member 159b is disposed in the pad holder 159a and slidable in the forward and rearward directions in the instant camera 102. The spring plate 159c biases the pad member 159b toward the pack chamber 126. Similarly the pad mechanism 160 includes a pad holder 160a, a pad member 160b and a spring plate 160c. When the pack chamber 126 is loaded with the instant photo film pack 125, the closing of the back door 129 causes the pad mechanisms 159 and 160 to enter the pack body 132 and press the rearmost one of the photo film units 114. So the first one of the photo film units 114 is kept flattened directly behind the exposure opening 134.

There are a middle support ridge 153a and arc-shaped support ridges 153b formed with the inner face of the second wall 153 for pushing the photo film units 114 toward the exposure opening 134, so that there occurs no gap between the exposure opening 134 and the light-shielding cover sheet 133 even when the photo film units 114 are accidentally moved inside the pack body 132.

The bottom light-shielding sheet 154 and the light-shielding push plate 155 are formed from plastic material having compatibility with polystyrene. Examples of this plastic material are polystyrene, polystyrene-modified polyphenylene ether, and the like, to which light-shielding material is added. Thus the pack body 132 is enabled to be pelletized without disassembling the bottom light-shielding sheet 154 or the light-shielding push plate 155 for the purpose of recycling.

The bottom light-shielding sheet 154 is flexible, has a thickness of 0.3–0.45 mm, and closes the pad insertion openings 157 and 158 in the second wall 153 internally. There are holes 154a and 154b and an opening 154c formed in the bottom light-shielding sheet 154. Caulking pins 153c and 153d are disposed on the second wall 153, inserted in the holes 154a and 154b and caulked to secure the middle of the bottom light-shielding sheet 154. The opening 154c is formed for protrusion of the middle support ridge 153a into the pack body 132. There are cutouts 154d and 154e formed in the bottom light-shielding sheet 154 respectively at its lateral edges and in positions away from the pad insertion openings 157 and 158. The cutouts 154d and 154e operate for locally reducing the strength of the bottom light-shielding sheet 154 and for providing the portion with flexibility.

The light-shielding push plate 155 has a thickness of 0.5–1.0 mm, and has resiliency suitable for pushing the photo film units 114. An opening 155a is formed in the middle of the light-shielding push plate 155 for avoiding interference between the middle support ridge 153a and the caulking pins 153c and 153d of the second wall 153. A bottom edge of the light-shielding push plate 155 is attached to that of the bottom light-shielding sheet 154. Note that, if the light-shielding push plate 155 is shaped to close the pad insertion openings 157 and 158, the opening 154c or the cutouts 154d and 154e in the bottom light-shielding sheet 154 may be formed in positions opposed to the pad insertion openings 157 and 158.

The back door 129 is closed after the instant photo film pack 125 is inserted into the pack chamber 126. The pad mechanisms 159 and 160 enter the pack body 132 through the pad insertion openings 157 and 158. The pad mechanisms 159 and 160 push the light-shielding push plate 155 indirectly with the bottom light-shielding sheet 154. The light-shielding push plate 155 applies pressure to the positive image creating surface of the photo film units 114 in a regularized manner. Thus the photo film units 114 are pushed toward the exposure opening 134. A first one of the photo film units 114 is positioned flatly behind the exposure opening 134. Accordingly there is no offset state of the light-shielding push plate 155 inside the pack body 132 because the bottom light-shielding sheet 154 exists between the light-shielding push plate 155 and the second wall 153. Even if the pad mechanisms 159 and 160 are not provided with extremely high biasing force, the light-shielding push plate 155 can be pressed toward the photo film units 114.

Figure 17:
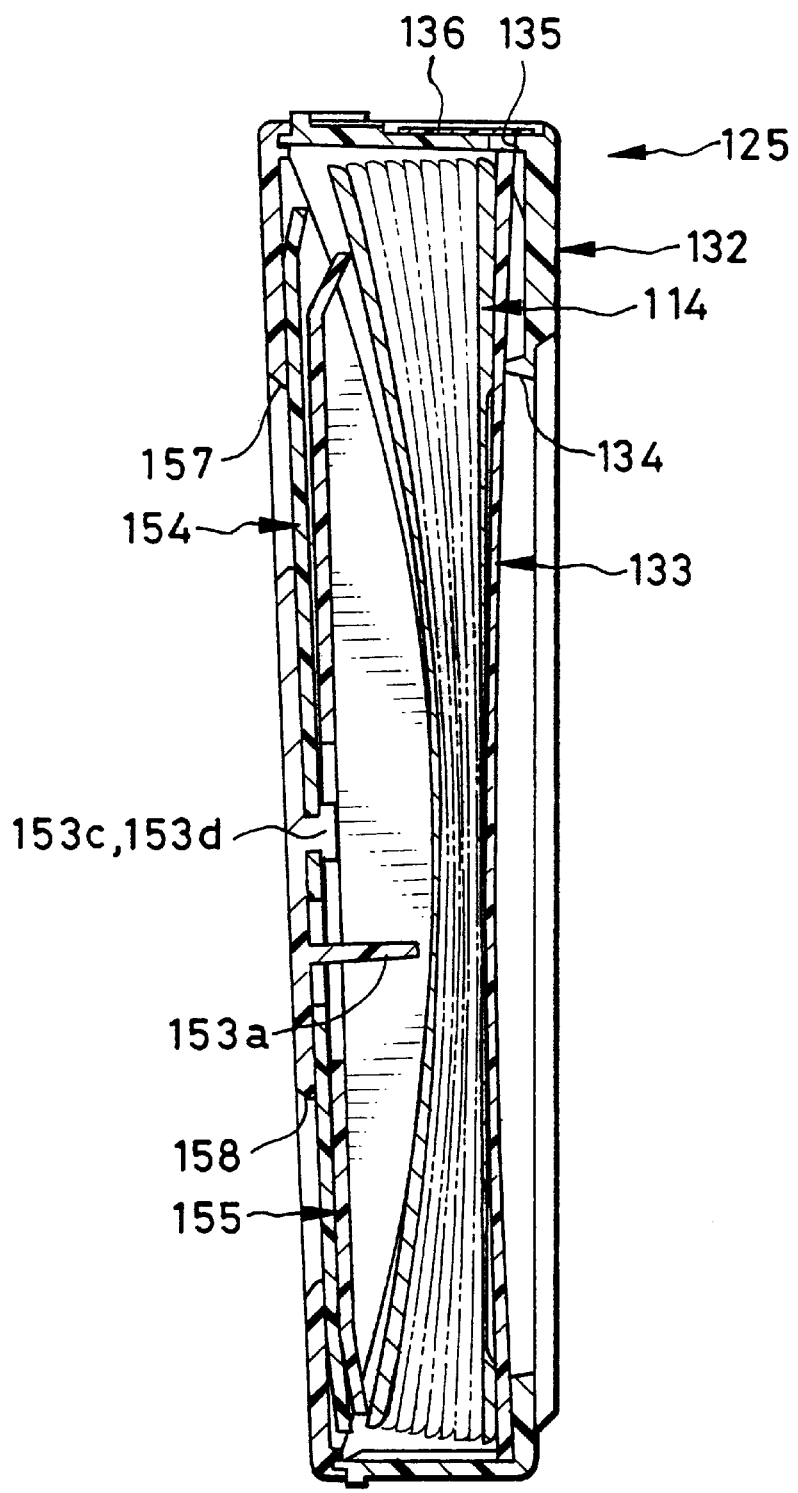
FIG. 17 is a vertical section illustrating the instant photo film pack before being used.

Each horizontal edge of the bottom light-shielding sheet 154 and the light-shielding push plate 155 is bent toward the stack of the photo film units 114. In FIG. 17, the edges of the bottom light-shielding sheet 154 and the light-shielding push plate 155 contact the photo film units 114 while the instant photo film pack 125 is unused. The bottom light-shielding sheet 154 and the light-shielding push plate 155 in combination are tightly fitted on the inner face of the second wall 153 for the purpose of protecting the pack body 132 from entry of ambient light. It is to be noted that, according to the prior art, the light-shielding sheet is weakly attached to the inner face of the second wall 153. However such weak attachment is not required in the present embodiment. Thus a manufacturing cost of the photo film pack can be reduced.

As illustrated in FIG. 17, the amount of projecting of the pad members 159b and 160b of the pad mechanisms 159 and 160 is exactly sufficient for pushing a final one of the photo film units 114 indirectly with the bottom light-shielding sheet 154 and the light-shielding push plate 155. Force applied by the pad mechanisms 159 and 160 to the photo film units 114 is decreased according to a decrease in the remainder of the photo film units 114 inside the pack body 132. Thus one of the photo film units 114 directly behind the exposure opening 134 does not project forwards through the exposure opening 134 in a flexed shape.

The operation of the present embodiment is described now. In FIG. 17, the exposure opening 134 in the front of the pack body 132 of the instant photo film pack 125 before use is closed by the light-shielding cover sheet 133. A light-shielding flap 136 closes the exit slit 135. The pad insertion openings 157 and 158 in the second wall 153 of the pack body 132 are closed by the bottom light-shielding sheet 154 and the light-shielding push plate 155. All of the top and bottom edges of the bottom light-shielding sheet 154 and the light-shielding push plate 155 have a bent shape, and contact the rearmost one of the photo film units 114. The bottom light-shielding sheet 154 and the light-shielding push plate 155 are positioned in tight contact with the inner face of the second wall 153, to avoid entry of ambient light.

After the instant photo film pack 125 being unused is inserted into the pack chamber 126 of the instant camera 102, the back door 129 is closed. In FIG. 14, the pad mechanisms 159 and 160 inside the back door 129 are inserted into the pad insertion openings 157 and 158 in the pack body 132, and push the light-shielding push plate 155 indirectly with the bottom light-shielding sheet 154. The light-shielding push plate 155 flattens the foremost one of the photo film units 114 by pushing them resiliently.

Exposures are taken one after another. The number of the remaining ones of the photo film units 114 in the pack body 132 is decreased. But the pad mechanisms 159 and 160 push up the photo film units 114 with the light-shielding push plate 155, so the foremost one of the photo film units 114 directly behind the exposure opening 134 is kept flat. The bottom light-shielding sheet 154 is formed thinly and also is provided with the cutouts 154*d* and 154*e* to lower the strength. Thus application of the pressure from the pad mechanisms 159 and 160 to the light-shielding push plate 155 is not hindered.

Figure 18A:
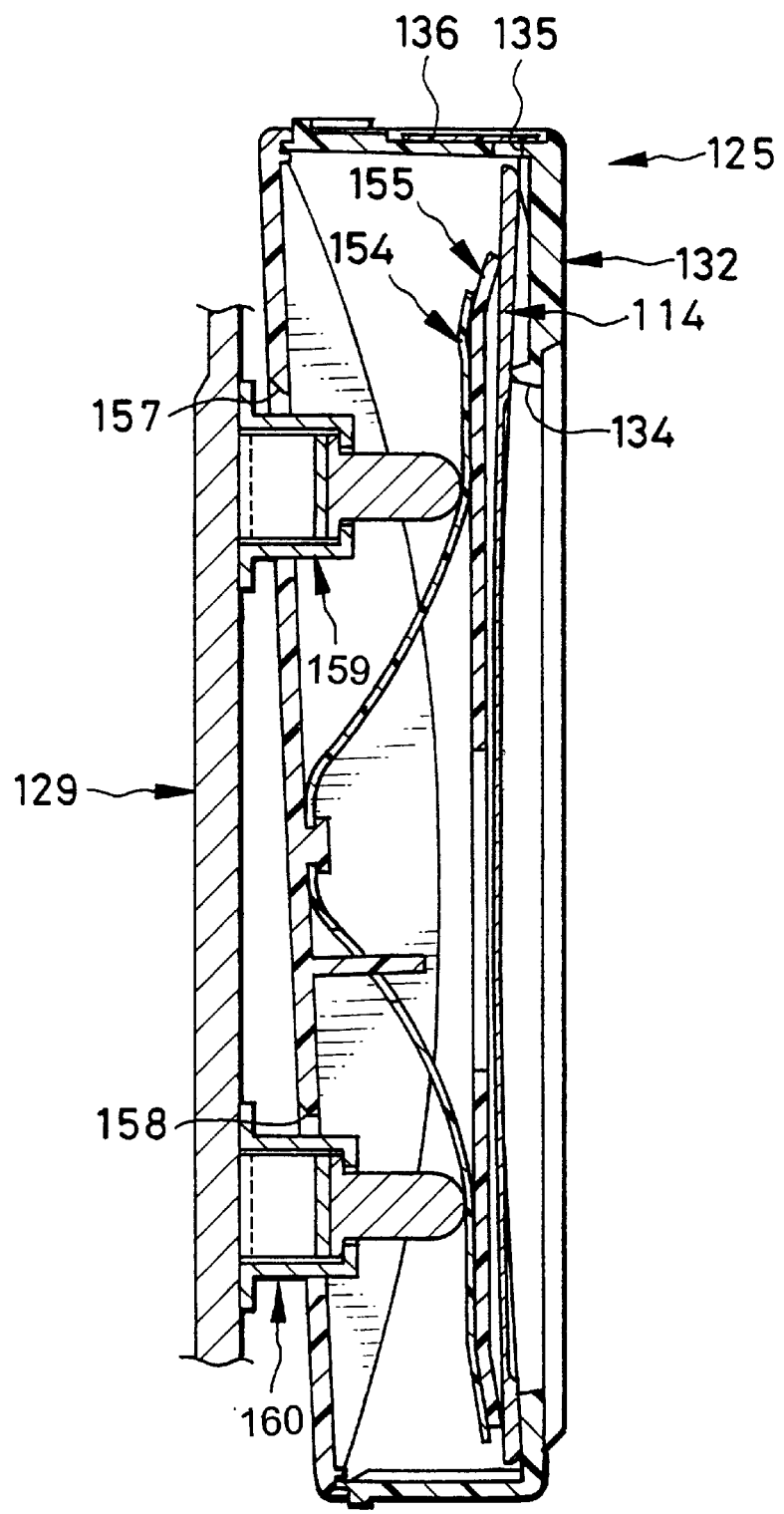
FIG. 18A is a vertical section illustrating a state of pad mechanisms pushing a final one of self-developing photo film units in the instant photo film pack.
Figure 18B:
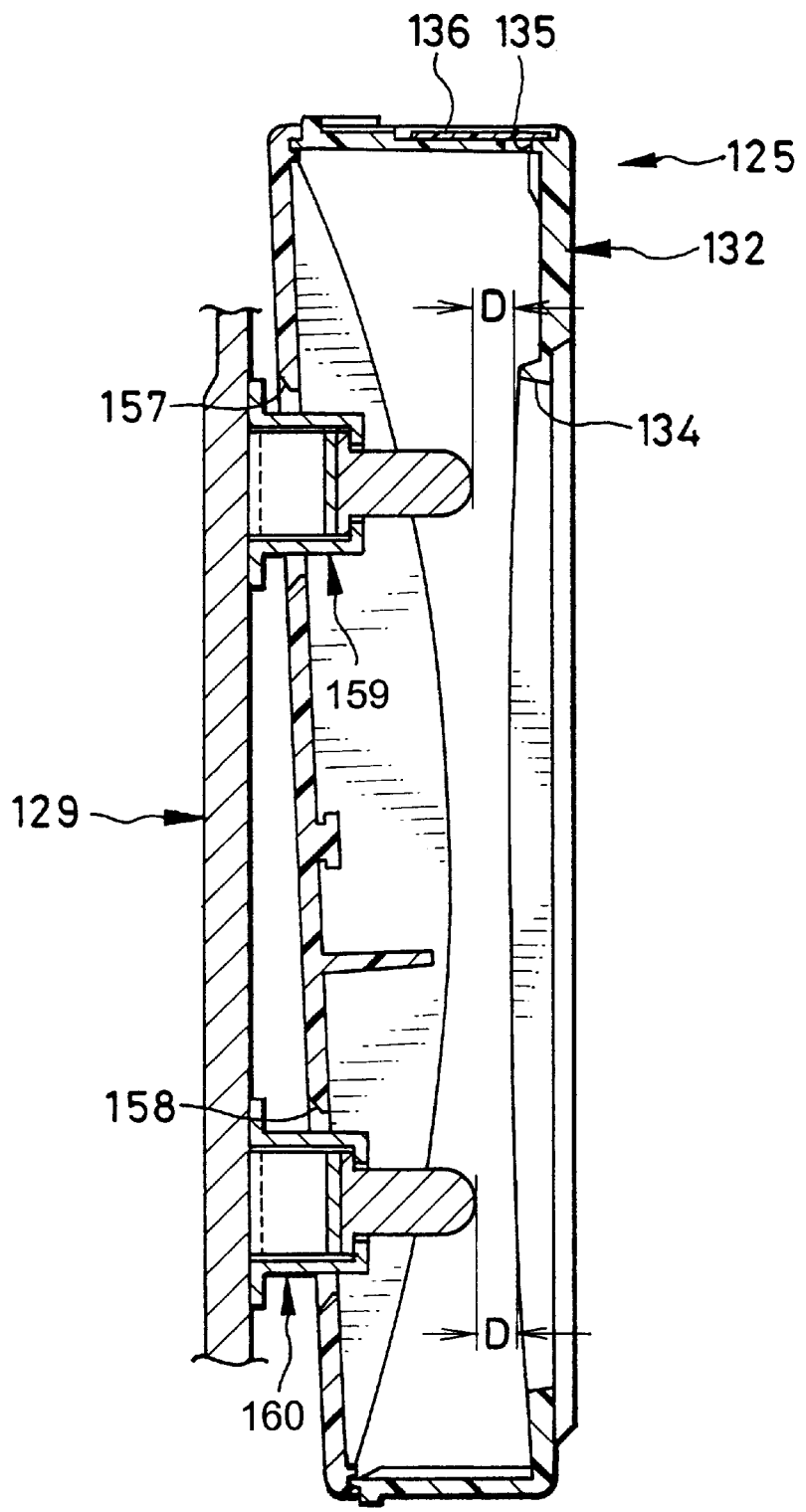
FIG. 18B is a vertical section illustrating a state of the pad mechanisms in a free state and associated with a pack body of the instant photo film pack.

In FIGS. 18A and 18B, the pad mechanisms 159 and 160 protrude as much as enough to push the final one of the photo film units 114 with the bottom light-shielding sheet 154 and the light-shielding push plate 155 when only the final one remains inside the pack body 132. There is no excessive pressure applied to the photo film units 114, and there is no influence to the flatness of the photo film units 114.

EXAMPLES

Experiments were conducted for checking the flatness of the photo film units 114 and suitability for the advance by use of the bottom light-shielding sheet 154, the light-shielding push plate 155 and the pad mechanisms 159 and 160 of various sizes. Tables 1 and 2 indicate results of the observed flatness. Tables 3 and 4 indicate results of the observed suitability for the advance. Note that, in relation to the projecting amount of the pad mechanisms 159 and 160, the indication "Prior Art" represents a structure projecting to the exposure opening in a free state. The indication "Preferred Example" represents a structure of the pad mechanisms 159 and 160 projecting, when in a free state, to a position defined to be offset from the inner face of the exposure opening to the rear as much as the sum of the thicknesses of the bottom light-shielding sheet 154 and the light-shielding push plate 155. For the suitability for the advance, grade A represents a success in advancing all the photo film units. Grade B represents the occurrence of failing in advance of at least one photo film unit. For the flatness, grade A represents a state within an acceptable range according to the industrial standards under the condition of the room temperature. Grade B represents that at least one of the photo film units had a state out of the acceptable range under the condition of the room temperature. The acceptable range of the flatness according to the industrial standards is ±1 mm from the focal plane of the instant camera.

TABLE 1

Flatness

| Projecting Amount: | | Light-shielding push plate 155 | | | |
|---|---|---|---|---|---|
| Prior art | | 0.3 mm | 0.5 mm | 0.8 mm | 1.0 mm |
| Bottom light-shielding sheet 154 | 0.3 mm | A | B | B | B |
| | 0.4 mm | A | B | B | B |
| | 0.5 mm | A | B | B | B |

TABLE 2

Flatness

| Projecting Amount: | | Light-shielding push plate 155 | | | |
|---|---|---|---|---|---|
| Preferred Example | | 0.3 mm | 0.5 mm | 0.8 mm | 1.0 mm |
| Bottom light-shielding sheet 154 | 0.3 mm | A | A | A | A |
| | 0.4 mm | A | A | A | A |
| | 0.5 mm | A | A | B | B |

TABLE 3

Suitability For Advance

| Projecting Amount: | | Light-shielding push plate 155 | | | |
|---|---|---|---|---|---|
| Prior Art | | 0.3 mm | 0.5 mm | 0.8 mm | 1.0 mm |
| Bottom light-shielding sheet 154 | 0.3 mm | B | A | A | A |
| | 0.4 mm | B | A | A | A |
| | 0.5 mm | B | A | A | A |

TABLE 4

Suitability For Advance

| Projecting Amount: | | Light-shielding push plate 155 | | | |
|---|---|---|---|---|---|
| Bottom Example | | 0.3 mm | 0.5 mm | 0.8 mm | 1.0 mm |
| Bottom light-shielding sheet 154 | 0.3 mm | B | A | A | A |
| | 0.4 mm | B | A | A | A |
| | 0.5 mm | B | A | A | A |

As a result, the combination of the bottom light-shielding sheet 154 and the light-shielding push plate 155 according to the preferred example is remarkably effective in improving the suitability for the advance of the photo film units 114. Also, the amount of protrusion of the pad mechanisms 159 and 160 is suitably reduced, so that the photo film unit 114 directly behind the exposure aperture can be kept flat even when only a small number of the photo film units 114 remain in the instant photo film pack.

In the above embodiments, the photo film units are the transmission type, in which the exposure surface to be exposed is different from the positive image creating surface where the positive image is created. However the photo film units can be a reflection type, in which the surface to be exposed is the same as a surface where the positive image is created. In the above embodiments, the instant camera is loaded with the photo film pack. However a printer or other optical instruments may be loaded with the photo film pack of the present invention. In the above embodiments, the photo film pack is a type having a relatively small size. However it is also possible in the present invention to construct a photo film pack of a type having a relatively large size.

In the above embodiments, the bottom edge of the light-shielding push plate 155 is attached to that of the bottom light-shielding sheet 154 with adhesive agent. Alternatively it is possible to attach a top edge of the light-shielding push plate 155 to that of the bottom light-shielding sheet 154. Furthermore, the light-shielding push plate 155 may be free from the bottom light-shielding sheet 154 without adhesion.

Furthermore, the bottom light-shielding sheet 154 and the light-shielding push plate 155 of FIGS. 14–18B can be used in the instant photo film pack 10 of FIGS. 1–12.

Another preferred embodiment is described with reference to FIGS. 19–20B for avoiding failure in attaching a light-shielding flap to an exit slit of an instant photo film pack.

In the prior art, a light-shielding flap or thin sheet of resin is attached to the exit slit of the photo film pack for avoiding entry of ambient light into the photo film pack and fogging of an unexposed one of the photo film units. For attaching the light-shielding flap, adhesive agent is used, an example of which is a hot-melt type for the reason of productivity of the photo film pack.

The light-shielding flap of the prior art is attached by use of a simply straight region of adhesion to the exit slit of the photo film pack. As the temperature changes from high temperature of hot-melt adhesion to low temperature, wrinkles or shrinkage in the light-shielding flap is likely to occur at the exit slit. A space or gap may be created with the exit slit typically at an end of the light-shielding flap. Ambient light may enter through the space of the gap to fog or expose the photo film units.

Figure 19:
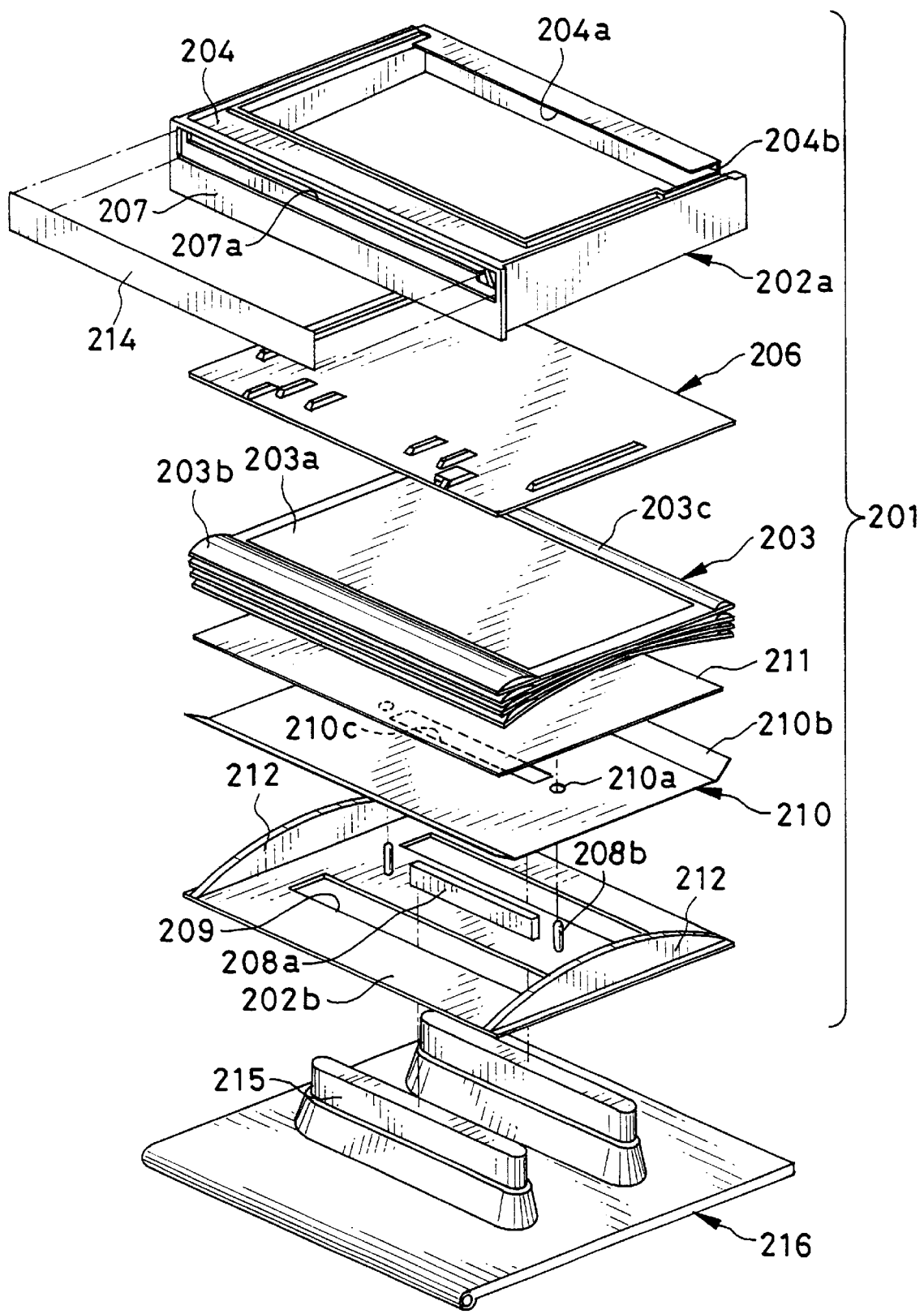
FIG. 19 is an exploded perspective illustrating another preferred instant photo film unit with a back door of an instant camera.

In FIG. 19, an instant photo film pack 201 is constituted by a pack body which contains a stack of plural self-developing photo film units 203. The pack body consists of a case member 202a and a second wall 202b. The pack body 202a, 202b is formed by injection molding from polystyrene with which carbon black and silicone are mixed.

A first wall 204 of the case member 202a is provided with an exposure opening 204a, which defines a region to expose each of the photo film units 203. A light-shielding cover sheet 206 closes the exposure opening 204a, and is laid on a first one of the photo film units 203 when the instant photo film pack 201 is unused. A claw-receiving cutout 204b is formed in combination with the exposure opening 204a, and receives entry of a claw member in an instant camera.

An exit slit 207a is formed in a top wall 207 of the case member 202a for passage of the photo film units 203 after being exposed. Each of the photo film units 203 and the light-shielding cover sheet 206 is exited through the exit slit 207a. The light-shielding cover sheet 206 is produced from resin, of which an example is the same as the resin for the pack body 202a, 202b. It is desirable that a ratio of silicone in the resin of the light-shielding cover sheet 206 should be greater than that for the pack body 202a, 202b so as to prevent failure in the advance of the photo film units 203.

The second wall 202b has caulking pins 208b, pad insertion openings 209 and a middle support ridge 208a. The caulking pins 208b are disposed between the pad insertion openings 209. The middle support ridge 208a is disposed between the caulking pins 208b. A flexible bottom light-shielding sheet 210 is secured to the second wall 202b, and includes holes 210a, a bent edge 210b and an opening 210c. The holes 210a receive the caulking pins 208b. The bent edge 210b is bent upwards. The opening 210c receives the middle support ridge 208a. The bottom light-shielding sheet 210 closes the pad insertion openings 209 in a light-tight manner. The bottom light-shielding sheet 210 is produced from resin. An example of the resin is polystyrene-modified polyphenylene ether, which is highly resistant to heat. Of course the bottom light-shielding sheet 210 may be produced from the polystyrene with the carbon black and the silicone in the same manner as the pack body 202a, 202b.

The central portion of the bottom light-shielding sheet 210 is secured to the second wall 202b by caulking the caulking pins 208b. Peripheral portions of the bottom light-shielding sheet 210 are weakly secured to the second wall 202b by adhesive agent of weak sealing. A small strength of this weak sealing is as small as to be pealed when pad members 215 push the bottom light-shielding sheet 210 through the pad insertion openings 209. Also a resilient light-shielding push plate 211 of a small thickness is secured to the inside of the bottom light-shielding sheet 210. Before loading to an instant camera, the light-shielding push plate 211 prevents looseness of the bottom light-shielding sheet 210 if the bottom light-shielding sheet 210 is peeled by shock or the like, so as to avoid leaking of light through the pad insertion openings 209.

Two arc-shaped support ridges 212 are disposed on the second wall 202b to extend vertically in the instant photo film pack 201.

A back door 216 of the instant camera is provided with the pad members 215, the number of which is the same as that of the pad insertion openings 209.

Each of the photo film units 203 includes an exposure region 203a of a photosensitive sheet, a developing solution pod 203b and a trapping portion 203c. The photosensitive sheet includes a photosensitive layer and a light receiving layer. The developing solution pod 203b encloses developing solution. The trapping portion 203c traps and hardens the surplus part of the developing solution.

Figure 20A:
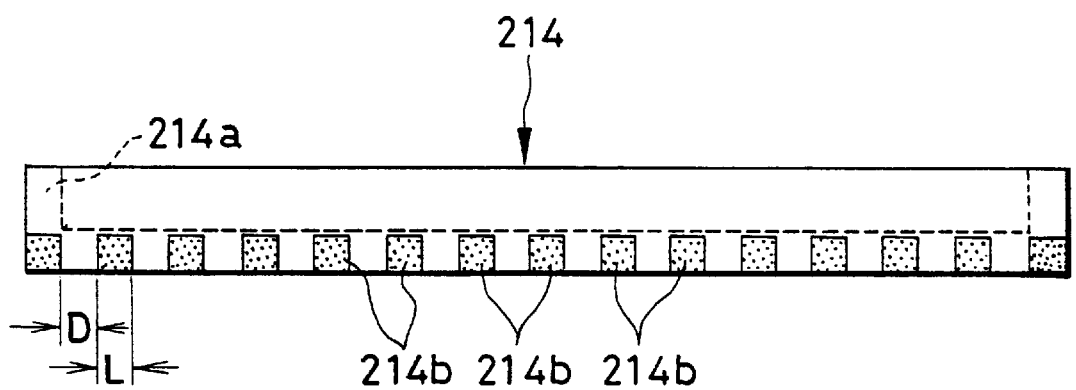
FIG. 20A is an explanatory view in plan, illustrating a manner of adhesion of a light-shielding flap.
Figure 20B:
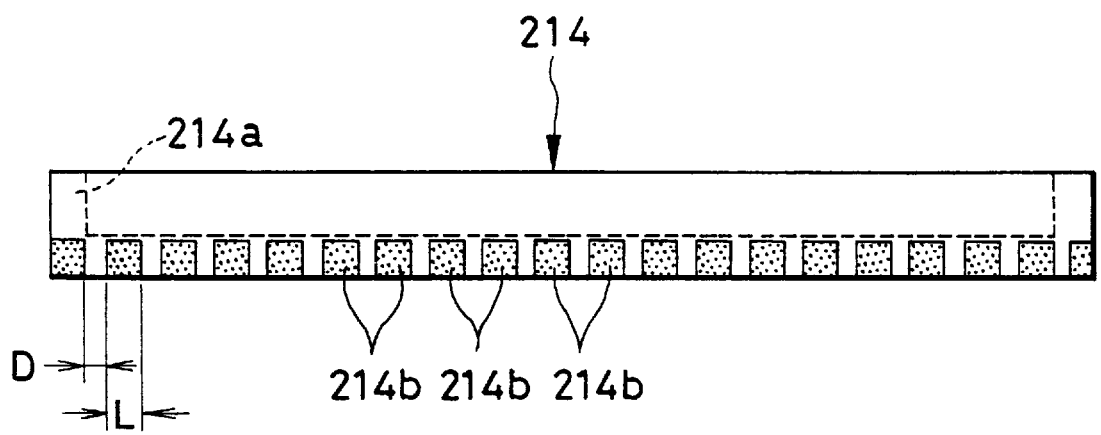
FIG. 20B is an explanatory view in plan, illustrating another preferred manner of the adhesion.

In FIGS. 20A and 20B, a back surface of a light-shielding flap 214 closing the exit slit 207a is provided with a coating pattern 214a having a channel shape, and coated with hot-melt adhesive agent in a uniform manner.

For manufacturing the instant photo film pack 201, a melting iron (not shown) is used to press the coating pattern 214a in the light-shielding flap 214. The iron includes projections arranged in a predetermined pattern and heated at a predetermined high temperature. Plural adhering regions 214b are created by application of pressure and heat to the coating pattern 214a. Let L be a range of each of the adhering regions 214b. Let D be a range of each of intervals between the adhering regions 214b. In FIG. 20A, L=D. In FIG. 20B, another preferred adhering regions 214b are depicted, which satisfy L:D=2:1.

The adhering regions 214b to be attached by hot-melt adhesion have an intermittent shape constituted by a train of spots which are included in the coating pattern 214a coated with the hot-melt adhesive agent in the light-shielding flap 214. Thus there occurs no wrinkle or shrinkage in the light-shielding flap 214 even upon great changes in the temperature in the course of heating and cooling. Even the two ends of the exit slit 207a can be closed by the light-shielding flap 214 reliably. There occurs no entry of ambient light through the ends of the exit slit 207a into the instant photo film pack 201, so that fogging of the photo film units 203 is avoided.

In the present embodiment, the adhering regions 214b of the light-shielding flap 214 are arranged as one train of spots. However the light-shielding flap 214 of the present invention may have a plurality of adhering regions of any shape, for example circular, quadrilateral, triangular or the like. In the light-shielding flap 214, at least the adhering regions can be coated with adhesive agent, and attached to the pack body 202.

Figure 21A:
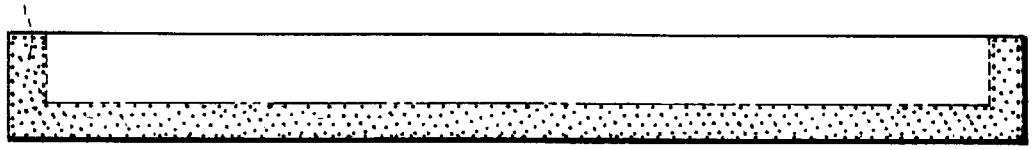
FIG. 21A is an explanatory view in plan, illustrating a channel-shaped manner of adhesion of a light-shielding flap.
Figure 21B:
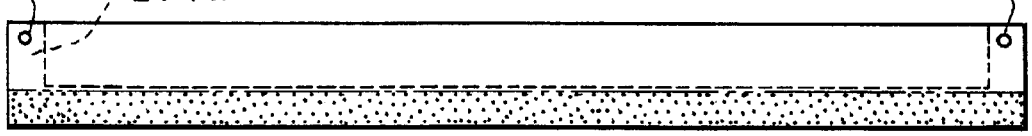
FIG. 21B and 21C are explanatory views in plan, illustrating still other preferred manners of the adhesion.
Figure 21C:
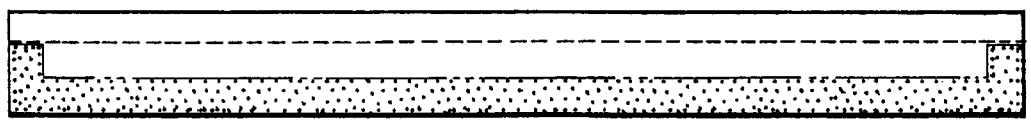

Other preferred light-shielding flaps are described now. In FIG. 21A, an adhering region is constituted by one straight portion, and two lateral portions protruding from ends of the straight portion perpendicularly. The adhering region is equal to the coating pattern 214a. In FIG. 21B, adhering regions includes one straight region and two lateral regions 214c sealed as spot regions. Note that the coating pattern 214a is defined by a line indicated by the broken line. In FIG. 21C, an adhering region is constituted by one straight portion, and two lateral portions protruding from ends of the straight portion perpendicularly. A coating pattern is defined by a line indicated by the broken line, so that a quadrilateral region is coated with the adhesive agent.

Note that the light-shielding flap 214, when the light-shielding cover sheet 206 or the photo film unit 203 advances through the exit slit 207a, is pushed open and deformed resiliently. Thus the adhesion of the two lateral regions 214c of the spot shape in FIG. 21B and the two lateral portions of the adhering region projecting from the straight portion in FIGS. 21A and 21C is peeled because of the resilient deformation of the light-shielding flap 214. Furthermore, it is possible to change the position and/or the size of the two lateral regions 214c of the spot shape in FIG. 21B, or the size of the two lateral portions of the adhering region projecting from the straight portion in FIGS. 21A and 21C, so that the adhesion remains without being peeled even when the light-shielding flap 214 is pushed open.

It is to be noted that the straight portion or straight region constituting the adhering regions of FIGS. 21A–21C can be provided with an intermittent adhering pattern of spot-shaped small regions according to each one of FIGS. 20A and 20B.

Figure 22A:
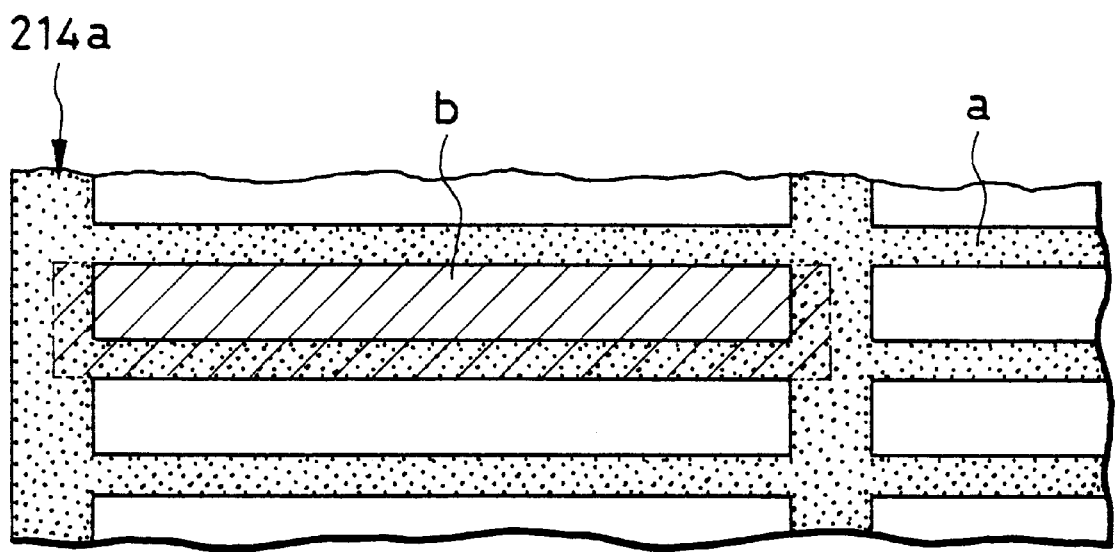
FIG. 22A is an explanatory view in plan, illustrating a manner of producing the light-shielding flap from continuous material.
Figure 22B:
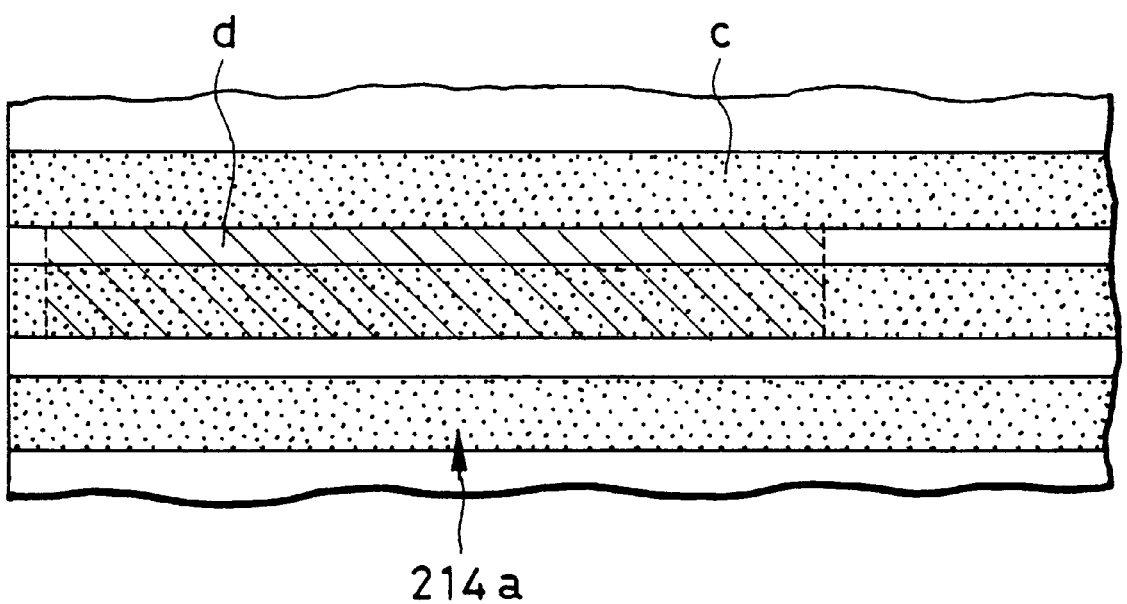
FIG. 22B is an explanatory view in plan, illustrating another manner of producing the light-shielding flap from continuous material.

In FIG. 22A, a manner of manufacturing the light-shielding flap 214 is illustrated. Web material or continuous sheet material is prepared, coated with hot-melt adhesive agent in a cyclic pattern of a grill indicated by the sign a, and cut at a predetermined size indicated by the sign b, to obtain numerous light-shielding flaps efficiently without waste. In FIG. 22B, web/material or continuous sheet material is coated with hot-melt adhesive agent in a cyclic pattern of stripes indicated by the sign c, and cut at a predetermined size indicated by the sign d. If hot-melt adhesive agent is in positions located directly around the exit slit in attachment of each light-shielding flap to the photo film pack, the force required for advance of each photo film unit is increased. Failure is likely to occur in the advance. Thus it is desirable that no hot-melt adhesive agent should be in positions located directly around the exit slit.

For the light-shielding flap 214, a sheet material included as a base material is produced from polyethylene terephthalate (PET) with light-shielding agent mixed therein, and has a preferable thickness of approximately 25 μm. The hot-melt adhesive agent of the light-shielding flap 214 can be selected from various suitable examples.

Examples of methods used for applying a pattern coating of hot-melt adhesive agent are coating with hot-melt coaters in combination with a gravure roll, gravure printing, silk screen printing and the like. Examples of hot-melt adhesive agents with hot-melt coaters are ethylene-vinyl acetate copolymer types, polyethylene types, atactic polypropylene types, ethylene-acrylic acid copolymer types, polyamide types, polyester types and the like. Any type of hot-melt adhesive agent for use with plastic material may be used, for example, a polyolefin type of hot-melt adhesive agent DH579B (trade name) manufactured by Nogawa Chemical Co., Ltd.

Hot-melt adhesive agent is characterized in not including any water or solvent. There are only limited types of applicators suitable for the hot-melt adhesive agent. There is heat-pressure adhesive agent, which is obtained by resolving the hot-melt adhesive agent in solvent or by emulsifying the hot-melt adhesive agent, and which can be printed by widely used printing machines.

An example of hot-melt adhesive agent for use in the silk screen printing is Seikadain 1900W (trade name) manufactured by Dainichi Chemical Industry Co., Ltd., which is an ethylene-vinyl acetate (EVA) copolymer emulsion type of heat-pressure adhesive agent. Examples of hot-melt adhesive agents for use in the gravure printing are a heat activation type of crystallization retarding adhesive agent, a heat pressure type of adhesive agent, and the like. Examples of the heat pressure type of adhesive agent are Seikadain 1900W as mentioned above, and PP66 Seal-C (trade name) manufactured by Toyo Ink Manufacturing Co., Ltd. as an ethylene-vinyl acetate (EVA) copolymer solvent type of heat-pressure adhesive agent.

In spite of the above description, the adhesive agent in the present invention may be a type different from hot-melt adhesive agent.

EXAMPLES

Experiments were conducted to test the above embodiment in relation to subjecting a sample to light.

Sample of the invention. The light-shielding flap was coated with adhesive agent in a linear manner intermittently. An instant photo film pack for containing ten self-developing photo film units was provided with the light-shielding flap, which was attached to the exit slit by heat attachment at 130° C. for 0.5 second. The photo film pack was left to stand at 70° C. for two (2) hours, then was returned to an environment of a room temperature, was subjected to light of 70,000 lux for three (3) minutes. Afterwards, the developing solution was spread.

Comparative example. The light-shielding flap was coated with adhesive agent in a linear manner continuously without intermittence. An instant photo film pack for containing ten self-developing photo film units was provided with the light-shielding flap, which was attached to the exit slit in the linear manner by heat attachment at 130° C. for 0.5 second. After this, the photo film pack was treated in the same manner as the Sample of the invention.

Results. According to the Sample of the invention, no fogging was discovered on any of the ten photo film units. But according to the Comparative example, even the second, third and fourth of the stacked photo film units were fogged.

It is to be noted that the light-shielding flap 214 according to the embodiment of FIGS. 19–22B may be used in the instant photo film pack 10 of FIGS. 1–12, or in the instant photo film pack 125 of FIGS. 14–18B.

In the above embodiments, the photo film pack is oriented vertically when used with the instant camera. However the photo film pack when used in an optical instrument may be oriented in any direction in the present invention, for example horizontally, so that a relevant optical instrument such as an instant camera may have an exit in its front, and that the photo film units may be advanced forwards out of the camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant photo film pack for containing a plurality of self-developing photo film units, said instant photo film pack including a box-shaped pack body, an exposure opening formed in said pack body for providing each one of said photo film units with an exposure, and an exit slit formed in said pack body for exiting said each one photo film unit being exposed to an outside of said pack body, said instant photo film pack comprising:

a light-shielding cover sheet, disposed between said photo film units and said exposure opening, for closing said exposure opening in a light-tight manner, said cover sheet having first and second surfaces, said first surface being opposed to said exposure opening, said second surface being opposed to a first one of said photo film units, said light-shielding cover sheet being exited to said outside of said pack body through said exit slit by advancing an advancing edge thereof before said first photo film unit is exposed; and at least one projection portion, disposed to project from said second surface, for depressing said first photo film unit away from said exit slit, so as to prevent said first photo film unit from exiting with said light-shielding cover sheet.

2. An instant photo film pack as defined in claim 1, wherein said pack body is produced of polystyrene.

3. An instant photo film pack as defined in claim 2, further comprising at least one ridge formed with said projection portion to extend in an advancing direction of said light-shielding cover sheet.

4. An instant photo film pack as defined in claim 3, wherein said projection portion comprises two projection portions disposed close to ends of said advancing edge.

5. An instant photo film pack as defined in claim 4, wherein there is a dimple, formed in said first surface and associated with said projection portion, for keeping said projection portion resiliently deformable.

6. An instant photo film pack as defined in claim 5, wherein a height of one of said projection portion and of said ridge with reference to said first surface is greater than a height of said exit slit.

7. An instant photo film pack as defined in claim 3, further comprising:

a claw-receiving cutout, formed in said pack body, for receiving a claw of a camera, said claw being moved into and out of said claw-receiving cutout, for pushing one of a bottom edge of said light-shielding cover sheet and said each one photo film unit, to exit one of said light-shielding cover sheet and said each one photo film unit from said pack body through said exit slit; and a light-shielding film secured to said light-shielding cover sheet, having a skirt portion for projecting erectly with reference to said second surface by bending, said skirt portion preventing entry of ambient light through said claw-receiving cutout.

8. An instant photo film pack as defined in claim 3, further comprising a light-shielding flap for closing said exit slit, having a quadrilateral shape with first and second longer side lines and first and second shorter side lines, and being partially attached to said pack body with hot-melt adhesive agent.

9. An instant photo film pack as defined in claim 8, further comprising first, second and third adhering regions disposed in said light-shielding flap, and coated with said hot-melt adhesive agent, said first adhering region extending along said first longer side line, said second and third adhering regions extending along said first and second shorter side lines, being disposed away from an extension of said exit slit, and being peeled when said light-shielding cover sheet is exited.

10. An instant photo film pack as defined in claim 8, further comprising first, second and third adhering regions disposed in said light-shielding flap, coated with said hot-melt adhesive agent, and connected to have such a channel shape that said exit slit is partially surrounded therein, said first adhering region extending along said first longer side line, said second and third adhering regions extending along said first and second shorter side lines, and being peeled at least partially when said light-shielding cover sheet is exited.

11. An instant photo film pack as defined in claim 8, wherein said light-shielding flap includes a first adhering region coated with said hot-melt adhesive agent in a spotted pattern, and disposed to extend along said first longer side line.

12. An instant photo film pack as defined in claim 3, further comprising:

a pad insertion opening, formed in said pack body, for receiving insertion of a pad member of a camera, said pad member being adapted to pushing said photo film units toward said exposure opening; and a flexible bottom light-shielding sheet for closing said pad insertion opening, partially secured to an inside of said pack body, produced from plastic material having compatibility with said polystyrene material of said pack body, and having a thickness of 0.3–0.45 mm; and a push plate, partially secured to said bottom light-shielding sheet, disposed between said photo film units and said bottom light-shielding sheet, for pushing said photo film units in a regularized manner toward said exposure opening in response to force from said pad member.

13. An instant photo film pack for containing a plurality of self-developing photo film units, said instant photo film pack including a box-shaped pack body of polystyrene, and an exposure opening, an exit slit and at least one pad insertion opening each formed in said pack body, wherein each one of said photo film units is exposed by light passed through said exposure opening, and exited through said exit slit by advancing an advancing edge thereof, and said pad insertion opening receives insertion of a pad member of a camera for pushing said photo film units toward said exposure opening, said instant photo film pack comprising:

a flexible bottom light-shielding sheet for closing said pad insertion opening, partially secured to an inside of said pack body, produced from plastic material having compatibility with said polystyrene material of said pack body, and having a thickness of 0.3–0.45 mm; and a push plate, disposed between said photo film units and said bottom light-shielding sheet, for pushing said photo film units in a regularized manner toward said exposure opening in response to force from said pad member, said push plate being produced from plastic material having compatibility with said polystyrene material of said pack body, and having a thickness of 0.5–1.00 mm.

14. An instant photo film pack as defined in claim 13, wherein substantially a center of said bottom light-shielding sheet is secured to said inside of said pack body, and a portion of said bottom light-shielding sheet is secured to said push plate.

15. An instant photo film pack as defined in claim 14, wherein said pad insertion opening comprises plural pad insertion openings formed in a front end portion and a rear end portion of said pack body.

16. An instant photo film pack as defined in claim 15, wherein said bottom light-shielding sheet includes cutouts formed in lateral sides of said center to facilitate deformation in response to being pushed by said pad member.

17. An instant photo film pack as defined in claim 13, wherein said push plate has a bent portion, defined by bending an edge thereof toward said exposure opening, for pushing an edge of said photo film units in a manner irrespective of being pushed by said pad member.

18. An instant camera loadable with an instant photo film pack, said instant photo film pack including a plurality of self-developing photo film units and a pack for containing said photo film units, said pack including a box-shaped pack body, an exposure opening, an exit slit and at least one pad insertion opening each formed in said pack body, and a bottom light-shielding member disposed in said pack body, each one of said photo film units being exposed by light passed through said exposure opening, and exited through said exit slit by advancing an advancing edge thereof, and said bottom light shielding member closing said pad insertion opening, said instant camera comprising:

a pack chamber loadable with said instant photo film pack;

a door for closing said pack chamber in an openable manner; and a pad member, disposed on an inside of said door, inserted in said pad insertion opening upon closing of said door, for pushing said photo film units toward said exposure opening with said bottom light-shielding member, wherein said pad member is insertable into said pack body by a distance L1 minus L2, where L1 is an internal height of said pack body, and L2 is a sum of a thickness of a stack of said photo film units and a thickness of said bottom light-shielding member;

wherein said bottom light-shielding member includes a central opening for insertion of a support ridge disposed centrally in said pack body and adjacent said pad insertion opening.

19. An instant camera as defined in claim 18, wherein said bottom light-shielding member includes a flexible bottom light-shielding sheet for closing said pad insertion opening, and a push plate for pushing said photo film units in a regularized manner with said bottom light-shielding sheet by transmission of force from said pad member;

said bottom light-shielding sheet being partially secured to an inside of said pack body, produced from plastic material having compatibility with said polystyrene material of said pack body, and having a thickness of 0.3–0.45 mm;

a portion of said bottom light-shielding sheet being secured to said push plate; and said push plate being produced from plastic material having compatibility with said polystyrene material of said pack body, and having a thickness of 0.5–1.0 mm.

20. An instant camera as defined in claim 18, wherein said push plate has a bent portion, defined by bending an edge thereof toward said exposure opening, for pushing an edge of said photo film units in a manner irrespective of being pushed by said pad member.

21. An instant camera loadable with an instant photo film pack, said instant photo film pack including a plurality of self-developing photo film units and a pack for containing said photo film units, said pack including a box-shaped pack body, an exposure opening, an exit slit and at least one pad insertion opening each formed in said pack body, and a bottom light-shielding member disposed in said pack body, each one of said photo film units being exposed by light passed through said exposure opening, and exited through said exit slit by advancing an advancing edge thereof, and said bottom light shielding member closing said pad insertion opening, said instant camera comprising:

a pack chamber loadable with said instant photo film pack;

a door for closing said pack chamber in an openable manner; and a pad member, disposed on an inside of said door, inserted in said pad insertion opening upon closing of said door, for pushing said photo film units toward said exposure opening with said bottom light-shielding member, wherein said pad member is insertable into said pack body by a distance L1 minus L2, where L1 is an internal height of said pack body, and L2 is a sum of a thickness of a stack of said photo film units and a thickness of said bottom light-shielding member;

wherein said bottom light-shielding member includes a flexible bottom light-shielding sheet for closing said pad insertion opening, and a push plate for pushing said photo film units in a regularized manner with said bottom light-shielding sheet by transmission of force from said pad member;

said bottom light-shielding sheet being partially secured to an inside of said pack body, produced from plastic material having compatibility with said polystyrene material of said pack body, and having a thickness of 0.3–0.45 mm;

a portion of said bottom light-shielding sheet being secured to said push plate; and said push plate being produced from plastic material having compatibility with said polystyrene material of said pack body, and having a thickness of 0.5–1.0 mm.

22. An instant camera as defined in claim 21, wherein substantially a center of said bottom light-shielding sheet is secured to said pack body, and said bottom light-shielding sheet includes cutouts formed in lateral sides of said center to facilitate deformation in response to being pushed by said pad member.

* * * * *